United States Patent

[11] 3,614,622

[72] Inventor Jerry Lee Holsinger
Wellesley, Mass.

[21] Appl. No. 725,312

[22] Filed Apr. 30, 1968

[45] Patented Oct. 19, 1971

[73] Assignee Codex Corporation
Watertown, Mass.
Continuation-in-part of application Ser. No. 573,653, Aug. 19, 1966, now abandoned.

[54] DATA TRANSMISSION METHOD AND SYSTEM

2 Claims, 19 Drawing Figs.

[52] U.S. Cl. .......... 325/42, 178/69, 325/65, 328/162, 333/18

[51] Int. Cl. .......... H04b 3/04, H04b 3/10

[50] Field of Search .......... 178/5, 69, 69 A; 325/38, 42, 65; 333/17, 18, 25; 328/162, 163, 155; 179/2; 235/152

[56] References Cited

UNITED STATES PATENTS

| | | | |
|---|---|---|---|
| 3,289,082 | 11/1966 | Shumate | 178/66 |
| 3,368,168 | 2/1968 | Lucky | 333/18 |
| 3,375,473 | 3/1968 | Lucky | 333/18 |
| 3,390,336 | 6/1968 | Di Torro | 325/65 |
| 3,414,819 | 12/1968 | Lucky | 328/162 X |
| 3,414,845 | 12/1968 | Lucky | 333/18 |
| 3,430,145 | 2/1969 | Lord | 325/42 |
| 3,440,548 | 4/1969 | Saltzberg | 328/155 |
| 3,177,349 | 4/1965 | Zaborszky et al. | 235/152 |
| 3,508,153 | 4/1970 | Gerrish et al. | 333/18 X |

OTHER REFERENCES

Widrow and Hoff: " Adaptive Switching Circuits" 1960 Wescon Record Part 4 pp. 96– 104

Mantey, P. E.; " Convergent Automatic Synthesis Procedures for Sampled Data Networks with Feedback" Report SEL- 64- 112 (TR6773- 1) Stanford Electronics Laboratories Stanford, California, October 1964

*Primary Examiner*—Benedict V. Safourek
*Attorney*—John Noel Williams

ABSTRACT: Equalizers having variable coefficients which develop correction values from sums of weighted equalizer output errors that enable, among other things, rapid universal convergence both for initial setup and in the presence of data and inexpensive instrumentation. Disclosed are use of timed samples as the basis for the equalizer operation, digital filters as well as tapped delay lines to form the equalizer, weight forming continuously as well as infrequently, weight forming based upon the input to the equalizer, use of weights that have a sliding relationship in which a given error value is weighted by successive weights in forming successive correction values, and error forming based upon subtraction of signals representative of the output desired from the actual output of the equalizer.

Equalization in the presence of data is shown using the unequalized input to form the weights. In an example using pseudo-noise the weights are formed by cross-correlation of the input with the pseudo-noise. In an example using no pseudo-noise the data is treated as random and the unequalized input is employed to weight the equalizer output errors directly.

Various desired responses are shown helping to solve carrier jitter and other data handling problems.

Fig. 2A.

(1) $Z_k^v = \sum_{i=-n}^{n} X_i^v Y_{k-i}$ wherein: $n=14$; $X_i^o = \delta_{i,o}$ (2) $X_i^{v+1} = X_i^v + a(C_i^v)$ wherein: $a = 1/32$, $|i| \leq n$ (3) $S_i^v = \frac{1}{M(P+1)} \sum_{k=MPV+1}^{MP(V+1)} Z_k^v R_{k-i} - \frac{1}{M(P+1)} \sum_{k=MPV+1}^{MP(V+1)} Z_k^v R_{k+31} - \delta_{i,o}$ wherein: $|i| \leq n$; $P=63$; $M=16$; $R_k = \pm 2$ (4) $C_i^v = -\sum_{j=-n}^{n} S_j^v H_{j-i}$ wherein: $|i| \leq n$ (5) $H_i = \frac{1}{Q(P+1)} \sum_{k=1}^{QP} Z_k^o R_{k-i}$ wherein: $P=63$; $Q=128$; $|i| \leq n$ wherein: Z = output information pulse values
Y = input information pulse values
X = weighting coefficients of the digital equalizer
a = scale factor
C = correction values
S = estimated errors
R = pseudo-noise pulse values
H = weights

DATA TRANSMISSION METHOD AND SYSTEM

This application is a continuation-in-part of applicant's copending U.S. Pat. application Ser. No. 573,653 filed Aug. 19, 1966, and now abandoned.

This invention relates in general to equalizers and to data transmission systems and more particularly to high speed electrical pulse system which has operating characteristics and features that make it particularly useful for the rapid transmission of data pulses over telephone lines or undersea cables. The system of this invention may also be used for transmitting data pulses, between a transmitter and a receiver, over links other than a telephone line.

Telephone lines and cables provide readily available and reasonably inexpensive links for the transmission of electrical signals. But these lines have been developed over the years to be suitable for voice transmissions and their electrical and operating characteristics are extremely poor for the transmission of data. Their range of frequency response is low, in the neighborhood of only several thousand cycles per second. They cause a phase distortion in the transmitted signal. Their amplification characteristics are not uniform between one line and another or on the same line over a period of time. Signals transmitted over telephone lines are frequently multiplexed and otherwise processed during transmission so that the transmitter frequency is not accurately reproduced at the receiving end of the line and the error is not uniform or constant with either time or frequency.

The system of the present invention concerns a transmitter and a receiver, which are sometimes referred to in the art as a modem. The term "modem" was apparently derived from the terms modulator-demodulator but it is now applied to the transmitter-receiver generally. The modem described herein, that embodies this invention, has been especially developed to be interconnected by a telephone line. The telephone line is thus a link between the transmitter and receiver. When speaking in general, the means over which data is transmitted from transmitter to receiver shall be referred to as a link.

Presently known modem systems pose problems in being adapted to the differing electrical characteristics of these telephone lines. They operate too slowly. The rate at which data pulses can be accurately transmitted and received is limited as compared with the speeds desired for this type of communication.

It is thus a major purpose of this invention to provide a system which will make it possible to increase the rate at which data can be transmitted over circuits and links with poor transmitting characteristics and, in particular, to enable telephone and cable circuits with wide ranges of such electrical characteristics to serve as practical links for high speed data pulse communication.

It is a very specific goal of this invention to provide a system or modem which will transmit 9.6 kilobits of information per second over what are known as schedule 4B telephone lines.

Because no two telephone lines are alike, because any given telephone line changes with time (sometimes quite rapidly) and because it is important to standardize on transmitting and receiving equipment, it is a further object of the present invention to provide a system capable of adapting itself to achieve high speed data transmission rates with lines or connecting links having different characteristics. Indeed, while the following discussion will for convenience and simplicity refer to the application of the system or modem to a telephone line, including the various types of telephone transmission connection circuits, it should be understood the invention is not limited to this particular application. The portion of the modem that functions to bring about this self-adaptation of the system to the link is called an adaptive equalizer.

Known modems employed with telephone line links adapt to the wide range of characteristics found in ordinary telephone lines by employing adjustable all-pass network equalizers in which the phase distortion characteristics are manually juggled on a trial and error basis by an operator in order to compensate for the distortion in the link. This manual setup of the equalizer requires a great deal of time to obtain even approximate equalization. As a practical matter even this approximate equalization is not realizable because of the time factor. Accordingly, it is another purpose of this invention to provide a system or modem which adjusts itself to the characteristics of the particular link with which the modem is used.

It is another purpose of this invention to have such adjustment occur frequently to compensate for the variations in phase and other line characteristics during the transmission of data.

It is another purpose of this invention to provide a technique for the adjustment of the compensating characteristics of the receiver while data is being transmitted and without requiring the interruption of data transmittal. The electrical characteristics of the line frequently change during transmission. It is therefore important that the invention provide a frequent or substantially continuous adjustment of the receiver so as to follow and adapt to changes in the line characteristic.

Other purposes and objects of this invention will become apparent from a consideration of the following discussion.

As a brief introduction, the nature and general teaching of the invention can be summarized as follows.

It is well known in the art to provide for the rapid transmission of electrical data pulses over expensive connecting links that have good electrical characteristics. Over such links there is tolerably little distortion, and such transmission has many uses, indeed, it takes place within as well as between the various parts of most data processing equipment.

The problem arises when the machine parts handling the data are widely separated and an attempt is made to use readily available (and thus reasonably inexpensive) lines. Those lines cause distortion in the signal that, among other things, forces the use of big, clear and widely separated information pulses that can be easily detected at the receiver even though they may have been severely distorted. But the use of such pulses automatically means a slow data rate.

According to an important aspect of the present invention, there are provided improved ways of detecting the various distortions that may occur, of estimating those distortions, and of then adjusting the received pulses to compensate for the distortions. An equalizer is provided that has a set of variable parameters (often referred to as "coefficients" if their disposition in the equations defining the equalizer operation makes that term appropriate) for filtering a signal stream. Error values in the equalizer output are determined and successive corrections are added to the coefficients, the corrections being formed by, for each correction value, establishing a set of individual error values, weighting each with a particular weight, and forming the correction value as the sum of the weighted error values.

In briefest terms, a preferred embodiment of this invention involves the use of a digital filter to equalize (that is, compensate for distortion) the received pulse train. A known pseudo-noise signal is transmitted with the data signal to provide a reference so that the distortion can be measured or at least estimated. After having been passed through the digital filter, the received pseudo-noise signal is cross-correlated with a locally generated pseudo-noise reference signal to provide estimates $S_t$ of the errors in the digital filter output. These estimates $S_t$ are weighted by weights $H_t$ and combined to provide correction factors $(a)C_t$ for each coefficient $X_t$. The estimated error $S_t$ values are combined so that each $S_t$ value has an influence on each correction factor $(a)C_t$. Furthermore, the weights $H_t$ are developed to reflect the extent of intersymbol interference caused by the distortions in the link. In calculating each correction factor $(a)C_t$, not only is each estimated error $S_t$ employed, but a comparable number of the $H_t$ values are also employed. Thus a large number of the weights $H_t$ have an influence on each correction factor $(a)C_t$. The exact interrelation between these various $X_t$, $S_t$, $C_t$ and $H_t$ values can only be stated by a set of equations. FIG. 2A shows the set of equations that apply to a preferred embodiment.

The correction factors $(a)C_i$ are applied to modify the values of the coefficients $X_i$ in the digital filter and the above process repeated continuously. When equalization has been achieved each estimated error $S_i$ will average to zero and each coefficient $X_i$ will stabilize around its own fixed value.

Another important aspect of this invention comprehends the continued adjustment of the coefficients while transmitting data (without the use of a reference signal) by determining error values based upon recovered data values, taking a function of the error values and weighting by samples of the equalizer input, and forming the correction values as a function of the sum of the weighted terms. Included is a setup mode in which a random pulse sequence is substituted for the data, to achieve rapid initial setup of the coefficients.

Still another aspect of the invention is the adaptation of any of these techniques to desired equalizer responses which provide data pulse spectrums which are useful for handling problems such as phase jitter, timing recovery and multiplexing.

Other objects, purposes and features of this invention will become apparent from a consideration of the following detailed description and drawings in which:

FIG. 1 is a diagrammatic representation of a tapped delay line employed as an equalizer. FIG. 1A illustrates the problem tail that may appear under certain conditions.

FIG. 2 is a block diagram of a system embodying a preferred form of this invention. This system is the modem (transmitter plus receiver) and link. The receiver includes the adaptive equalizer. The equations of FIG. 2A indicate the significant functions performed by the circuits of FIG. 2.

FIG. 3 is a basic block diagram of an adaptive equalizer incorporating the teachings of this invention in a preferred form, which preferred form involves the employment of digital filtering. FIG. 3 is a simplified block diagram of the right-hand portion of FIG. 2 and thus the equations of FIG. 2A apply to FIG. 3 in the manner indicated on FIG. 3.

FIGS. 4 and 5 are block diagrams of the transmitter section and the receiver section, respectively, of an adaptation of the FIG. 2 system to the transmission of data over telephone lines. These two block diagrams simply show the additional circuitry necessary for converting the telephone line link into the appropriate low pass filter that is presumed to be available as the link between the transmitter and receiver in FIG. 2.

Figures 8, 8A:
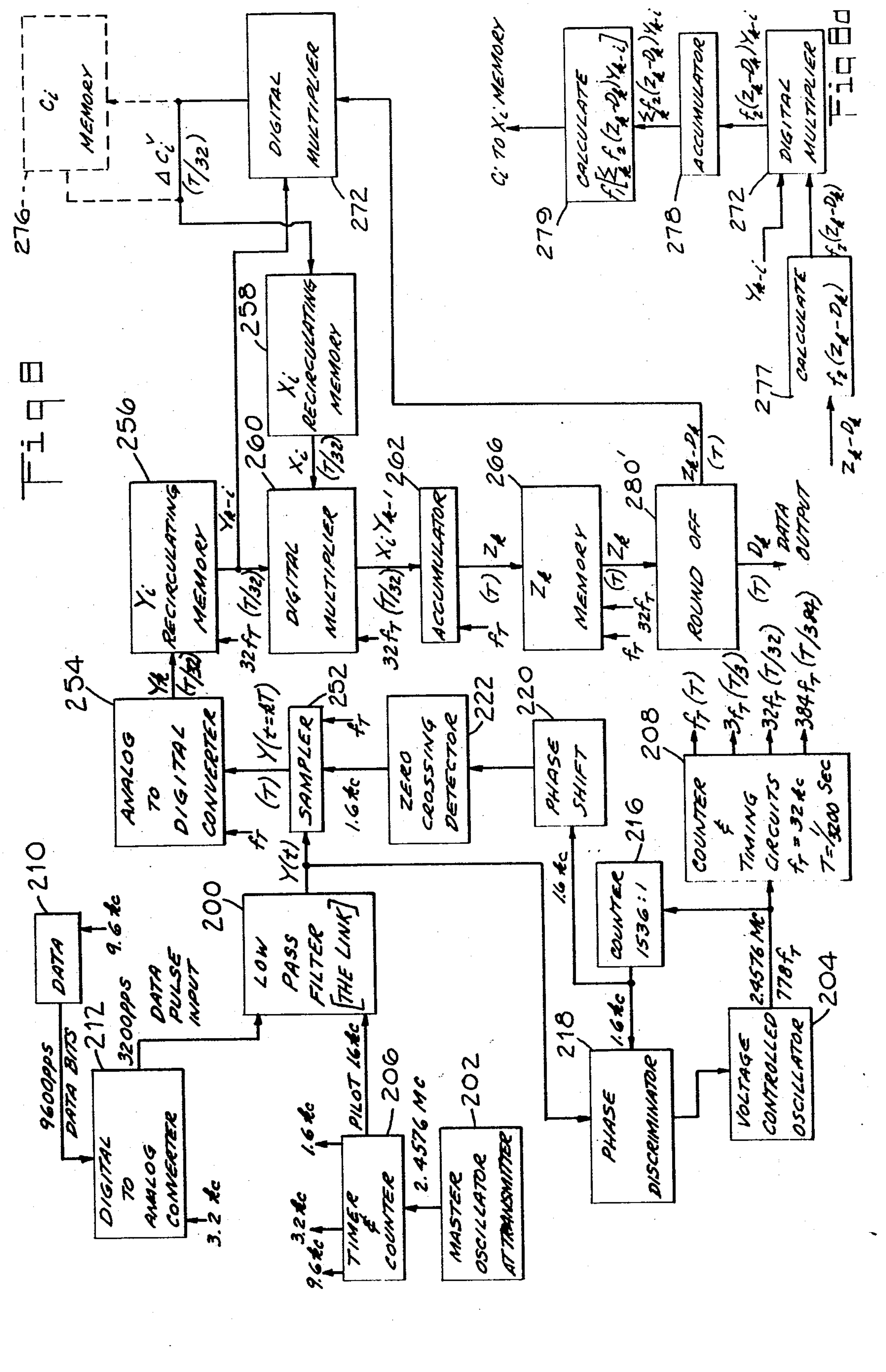
FIG. 8 is a block diagram, similar in form to FIG. 2, of a system embodying a further preferred form of the invention.

FIG. 8*a* is a block diagram of a modification of FIG. 8 to illustrate a more general form of the invention for equalizing in the presence of data.

Figure 8B:
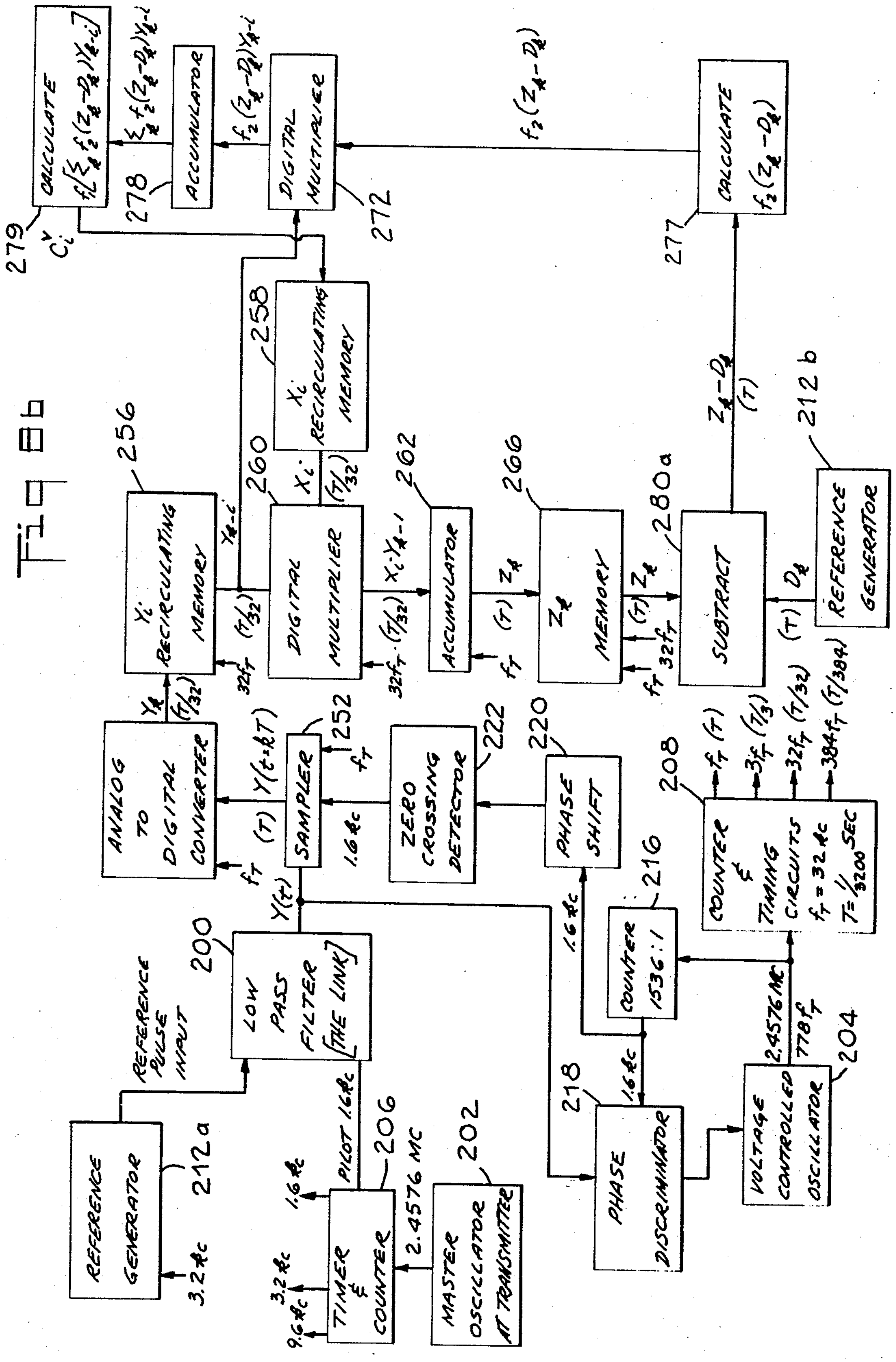

FIG. 8*b* is a block diagram similar to FIG. 8, showing a preferred setup implementation of the equalizer of FIG. 8*a*.

Figures 3, 4:
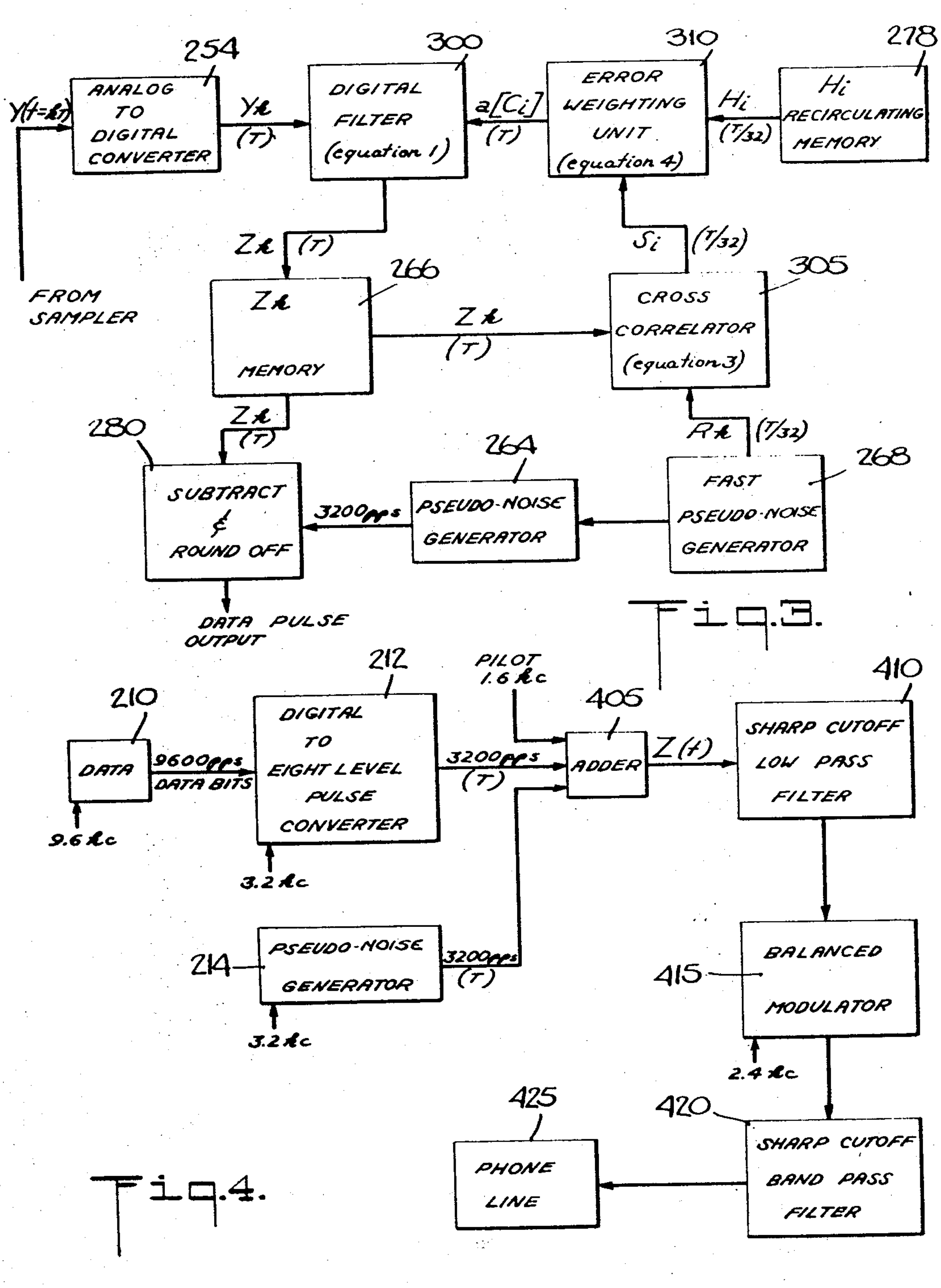
Figure 9:
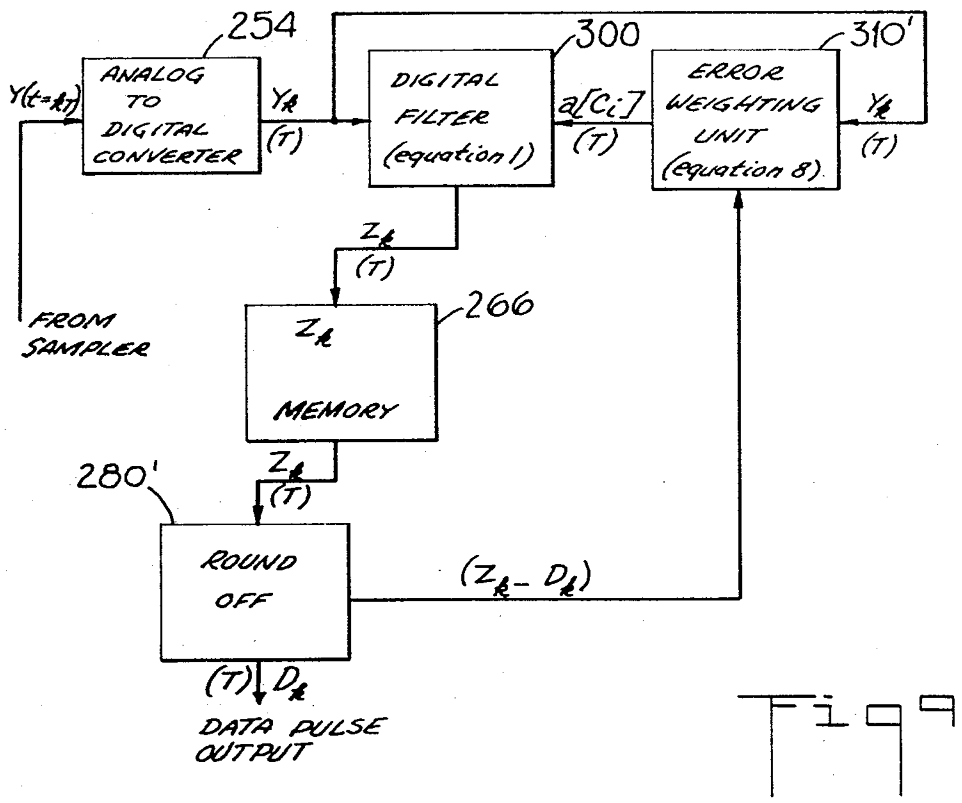

FIG. 9 is a basic block diagram, similar in form to FIG. 3, of an adaptive equalizer incorporating the teachings of this invention in another preferred form. It is a simplified block diagram of the right hand portion of FIG. 8.

Figure 10:
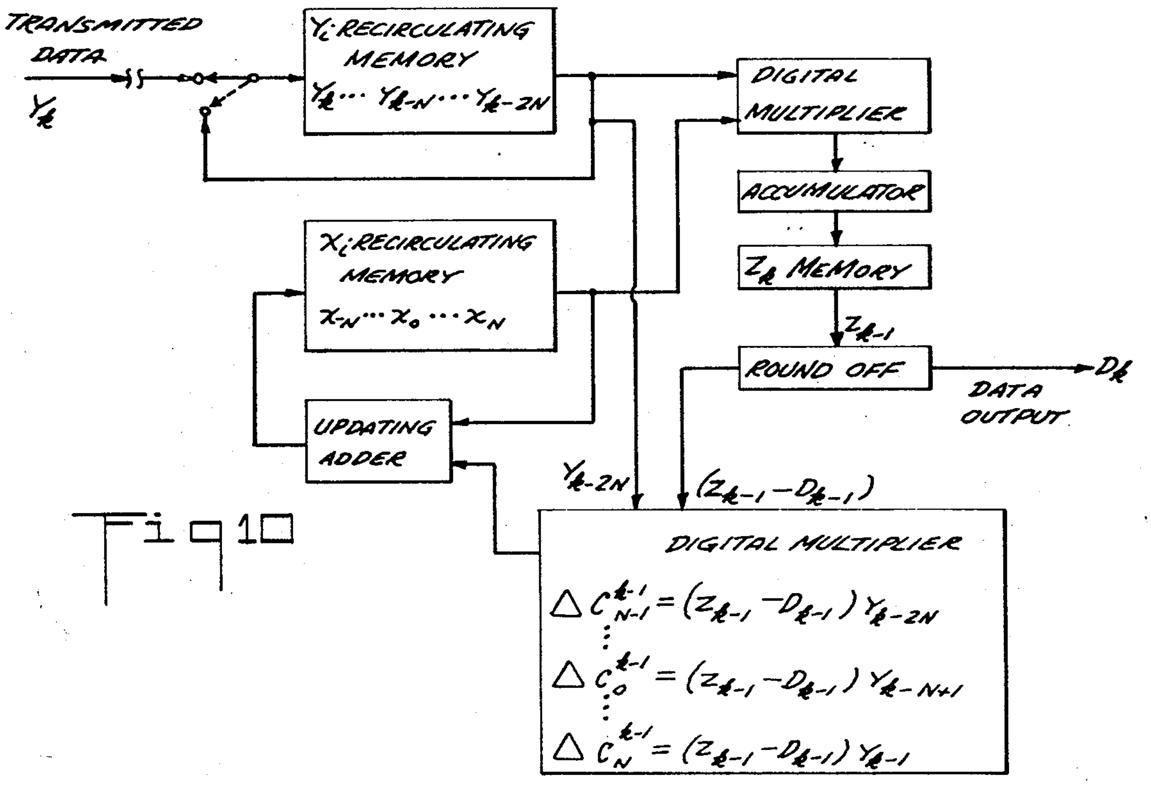

FIG. 10 is a block diagram, similar to the right portion of FIG. 8, of a further preferred form of adaptive equalizer incorporating the teachings of this invention.

Figures 11, 12, 13, 14:
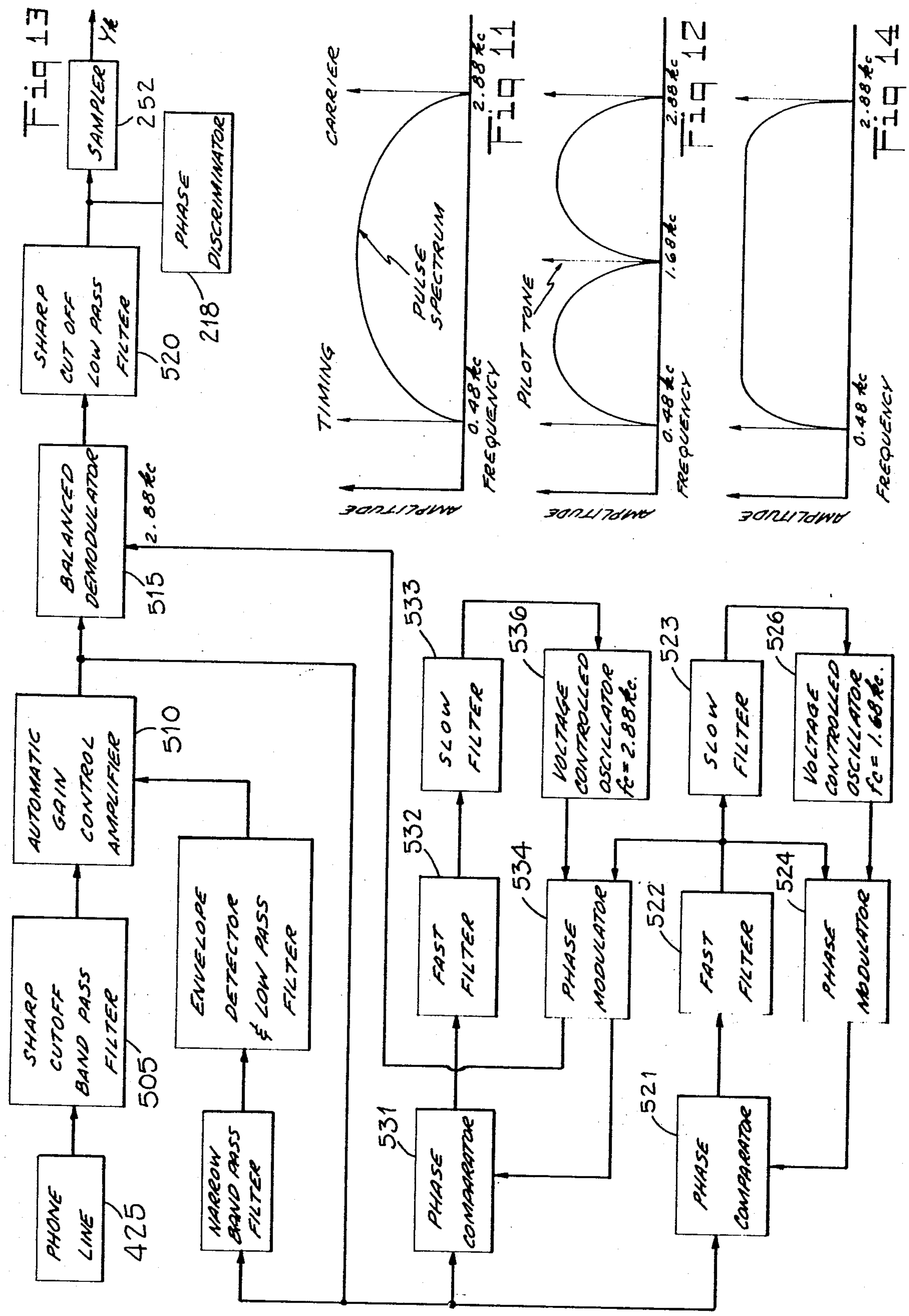

FIG. 11 is a frequency distribution diagram of signals employed in transmitting over a telephone link in which the desired response of an equalizer and the pilot tones have been related so as to improve the ability to recover data.

FIG. 12 is a diagram similar to FIG. 11 in which another preferred desired response is employed.

Figures 5, 6:
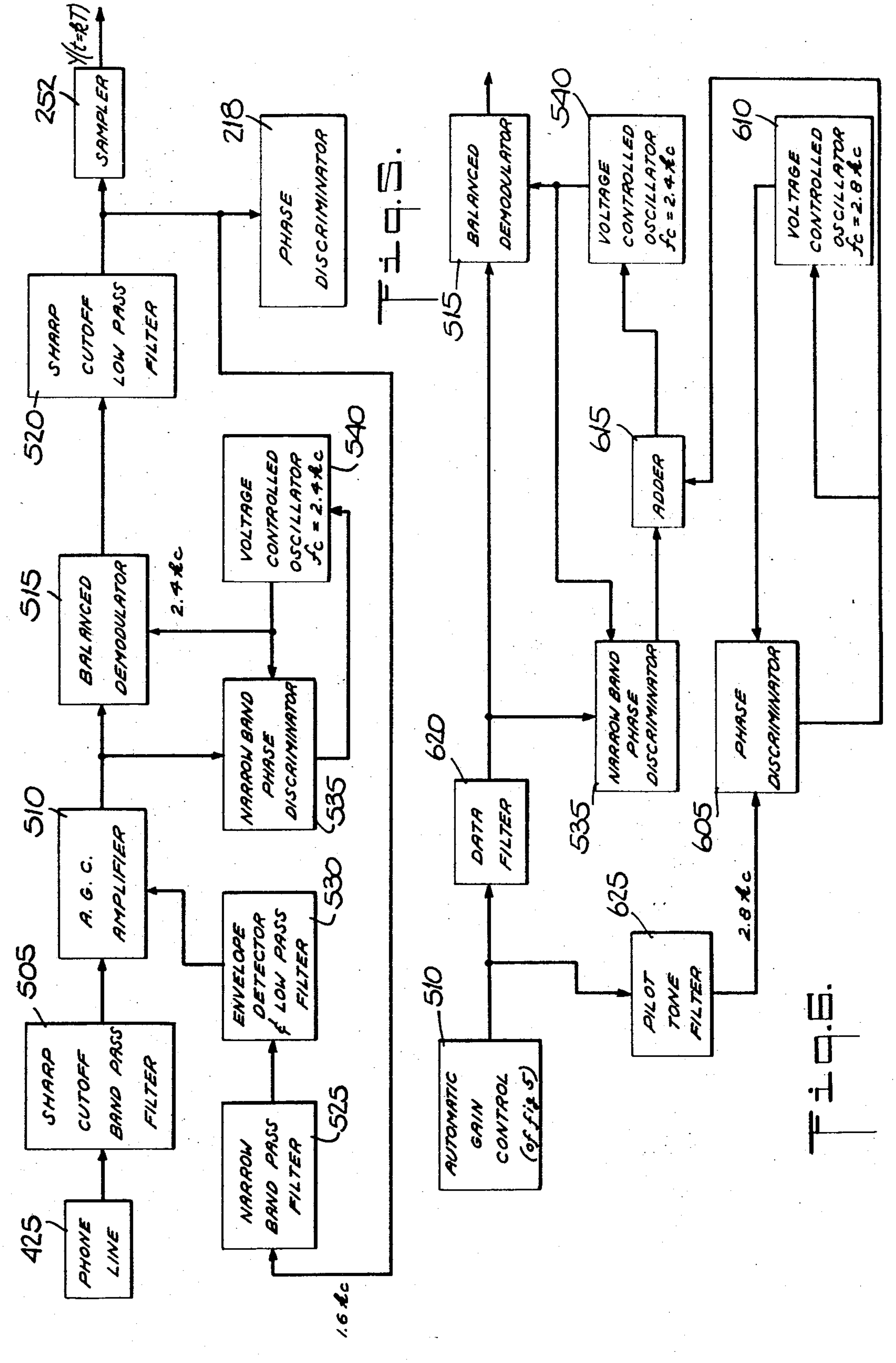
FIG. 6 is a block diagram of a jitter control circuit that is desirable to employ when this invention is applied to a telephone link.

FIG. 13 is a circuit diagram similar in form to FIG. 5, showing an instrumentation of the desired response of FIG. 12 to combat phase jitter.

FIG. 14 is a diagram similar to FIG. 11 in which an example of a preferred class of desired responses of an equalizer is employed.

Figure 15:
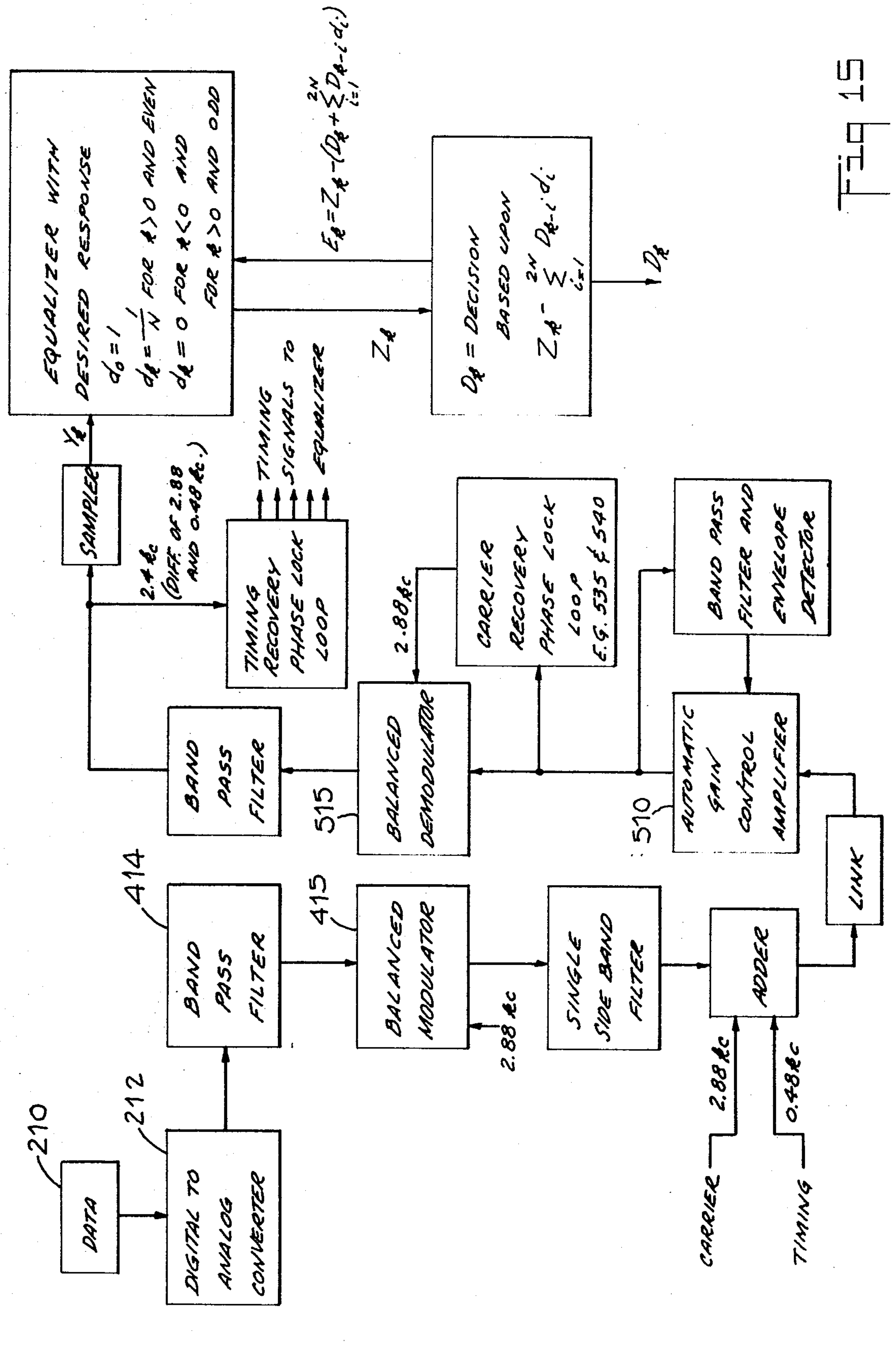

FIG. 15 is a general block diagram for an equalizer for the class of desired responses illustrated in FIG. 14.

Figure 16:
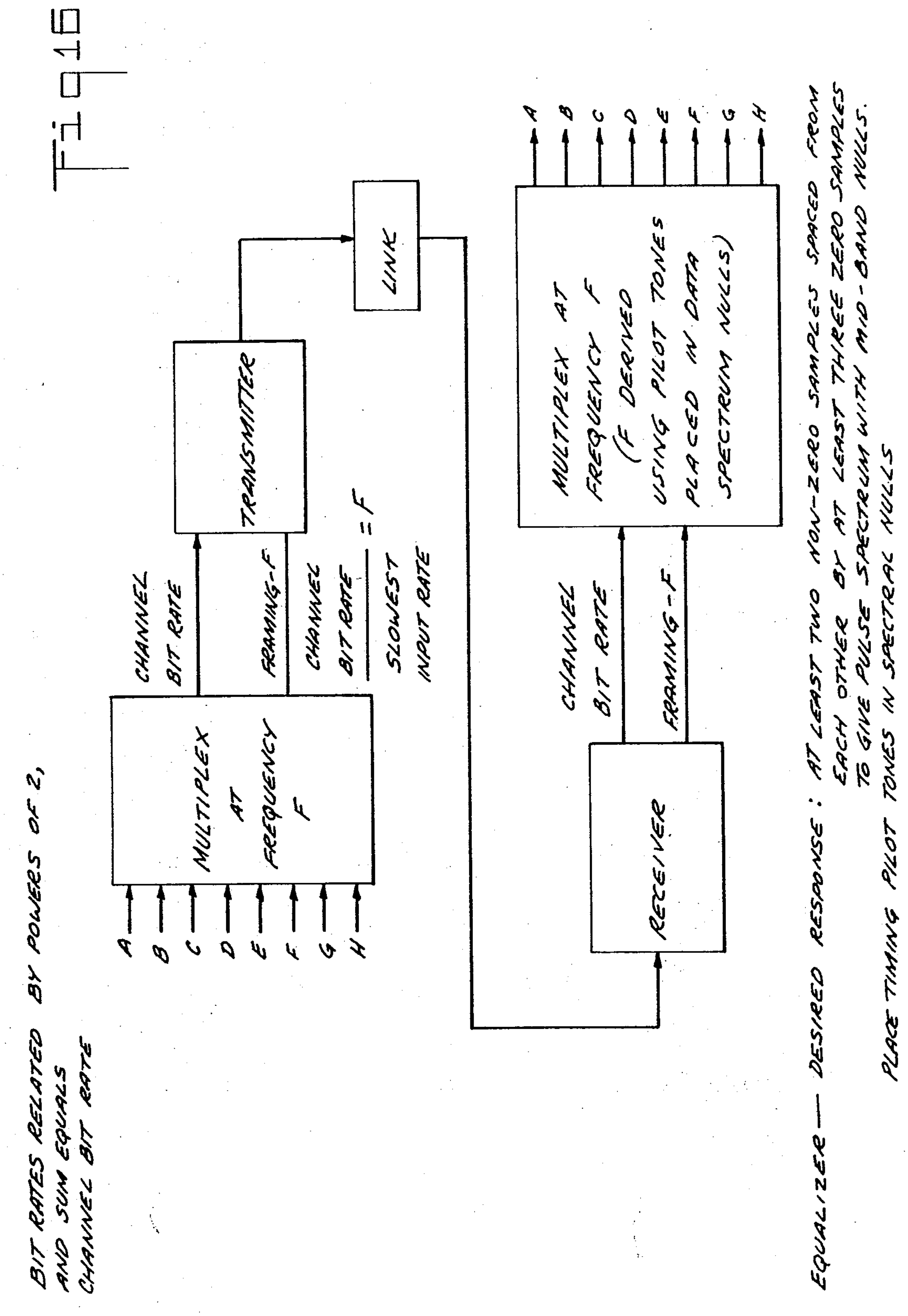

FIG. 16 is a general block diagram of a multiplex system employing the equalizer desired response illustrated in FIG. 12.

The description is intended to be read in light of what is already known to those skilled in the art, for example, that material described and referred to in the Handbook of Automation Computation and Control, particularly Volume 2 and the publications referred to therein, edited by Grabbe, Ramo & Wooldridge, published by Wiley (1959); R. W. Lucky "Automatic Equalization for Digital Communication," Bell System Technical Journal, Apr. 1965, pp. 547–589; F. K. Becker, et al., "Automatic Equalization for Digital Communication," Proceedings IEEE, Jan. 1965, pp. 96–97; M. A. Rappeport, "Automatic Equalization of Data Transmission Facility Distortion Using Transversal Equalizers," IEEE Trans. Comm. Tech., Sept. 1964, pp. 65–73; K. E. Schreiner, "Automatic Distortion Correction for Efficient Pulse Transmission," IBM Journal, Jan. 1965, pp. 20–30; W. S. Mohn, Jr. and L. L. Steckler, "Automatic Time-Domain Equalization," Ninth National Comm. Symposium, Utica, N. Y., Oct. 7–9, 1963, pp. 1–9; G. K. McAuliffe, "ADEM—An Adaptively Data Equalized High Speed Modem," International Conference on Military Electronics, 1964, MIL-E-Con 8, pp. 332–337. As a convenience to the reader, the following description includes some more specific references where it is thought they might be helpful, but such references are limited in number in the interests of brevity.

FIG. 1

Figures 1, 1A:
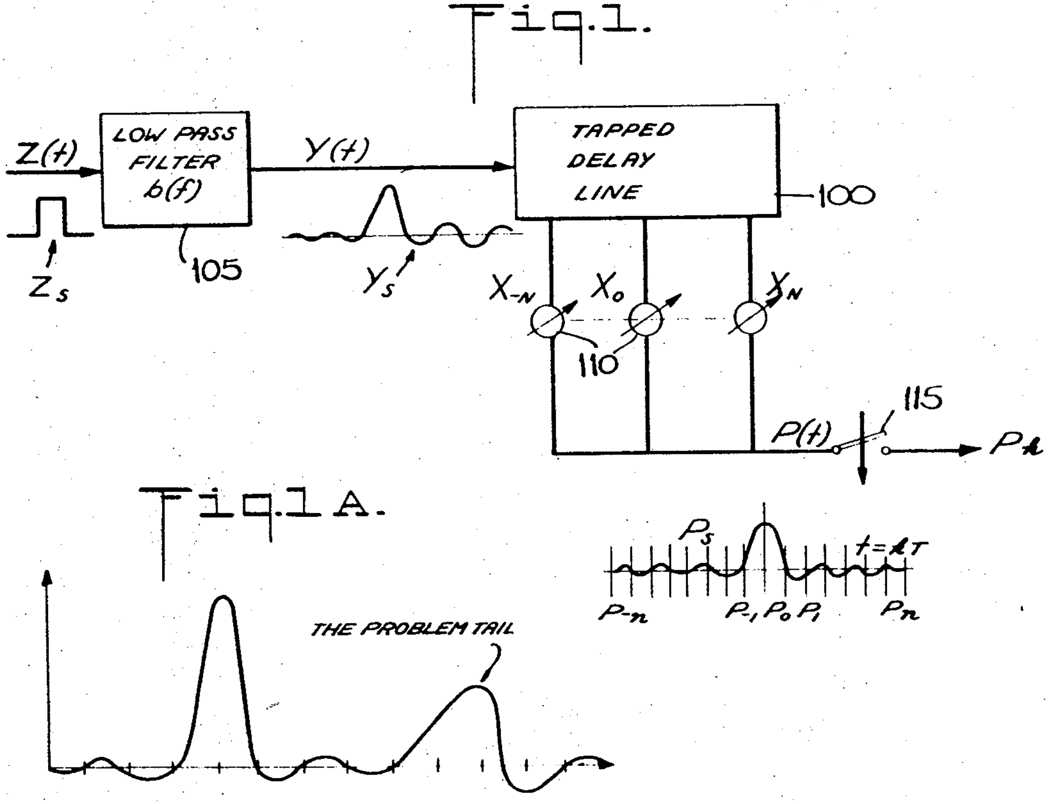

FIG. 1 is a diagrammatic representation of a tapped delay line 100 used in an equalizer. There are known systems that incorporate the FIG. 1 equalizer technique. The purpose of FIG. 1 herein is to provide a simplified explanation of the general technology with which this invention is involved.

In FIG. 1, a sequence of amplitude modulated information pulses $Z(t)$ is applied as the input to a low pass filter 105. The output of the low pass filter 105 is a distorted series of pulses $Y(t)$. The low pass filter 105 (which includes a link between the transmitter and the receiver) has a transfer function $b(f)$. If the receiver could include a circuit whose transfer function were the inverse of $b(f)$, then the distortions imposed by the low pass filter 105 could be compensated and accurate output pulses $Z(t)$ provided. It is simply not possible to take such an approach to solving the problem of compensating for the distortion in the transmitted signal for a number of reasons. The basic reason is that an inverse filter would greatly amplify line noise. Furthermore the cost of building such an inverse filter would be prohibitive.

The kind of distortions imposed by a typical low pass filter 105 (where such filter may include a telephone line) is suggested in FIG. 1 by a comparison of a single input test pulse $Z_s$ with the corresponding output pulse $Y_s$ from the filter 105. The corresponding output pulse $Y_s$ is so distorted that it is not only rounded but it is also preceded and succeeded by a series of what look like damped oscillations, that are conveniently called tails. When a series of pulses $Z(t)$ are the input, the output $Y(t)$ is the sum of a series of complex waves spaced from one another by the period between pulses in the input series $Z(t)$. The measured value of each main output pulse in the train $Y(t)$ is appreciably affected by the tails of the preceding and succeeding pulses. This intersymbol interference is a major limitation on the rate at which data can be sent.

These pulses $Z(t)$ have a uniform time period of T seconds. Specifically, one pulse $Z_k(t)$ comes along once each T seconds. If T equals 1/3200th of a second then the pulse repetition rate is 3.2 kilocycles. It is preferable, and it will be assumed throughout this specification that these information pulses $Z(t)$ are adjacent to one another so that there is no zero-amplitude period between pulses.

It has been found that a tapped delay line 100 with an appropriately set series of variable gain amplifiers 110 can provide compensation for the filter 105 distortion. The compensation provided does not completely restore the original pulse sequence $Z(t)$. The compensation does, however, make it possible to measure an accurate value for each pulse in the signal being transmitted by sampling the output of the tapped delay line once each T seconds at the appropriate time. In effect, the compensation adjusts the tails so that at each sampling instant, the tails cancel and the main pulse can be measured. The process of compensation for filter distortion at the sample instants is called equalization. It might be worth keeping in mind that the equalizer which performs this equalization, is an inverse filter over the frequency range zero to one-half T c.p.s.

The multitap delay line 100 may have 29 taps. A variable gain amplifier 110 is connected to the output of each tap. The amplifier for the center tap is designated as having a gain $X_0$. The gains of the two amplifiers connected to the two taps on either side of the center tap are designated as $X_1$ and $X_{11}$. By this notational convention, the gains of the two amplifiers at the end taps are designated $X_n$ and $X_{1n}$. There are thus, $2n+1$ taps and $2n+1$ tap gain amplifiers 110.

The combined output of the amplifiers 110 is a continuous signal $P(t)$. It has been found, and is well known in this art, that the appropriate selection of gain values $X_i$ for the various amplifiers 110 will provide an output signal $P(t)$ which, if sampled once each T seconds, at the appropriate time each T seconds, will provide a series of output voltage magnitudes $P_k$ that are an accurate representation of the magnitudes of the original pulses $Z(t)$. The switch 115 simply represents the sampling function. It is closed for an instant once each T seconds and thus provides an output pulse $P_k$ where $t=kT$.

The tapped delay line 100 and series of tap gain amplifiers constitute an equalizer. The tapped delay line 100 is constructed so that the data pulse as received, $Y(t)$ is repeated as a delayed replica at each of the taps in sequence every T seconds. In the example, the tapped delay line may have 29 taps, with a reference tap in the middle, but the number of taps need not be odd and the reference tap need not be centered in the delay line. Tapped delay lines like this are described in Landee, Davis, Albrecht, Electronic Designers Handbook, McGraw-Hill, Inc., 1957, pp. 20–59 to 20–61.

The output of each tap is supplied to a variable gain amplifier 110. The function of these amplifiers 110 is to vary the amplitude of the tap output with which they are connected. They should be capable of having a gain that ranges from negative to positive.

In practice and for economy, the ordinary variable gain amplifiers can be replaced by analog-to-digital converters, digital potentiometers, and inverting amplifiers which can be used to serve the same function. For a discussion of such potentiometers, see Grabbe, Ramo and Wooldridge, Volume 2, supra, at pp. 20–50 to 20–60.

The tap outputs, after each has been adjusted by its variable gain amplifier 110, are summed to provide the signal $P(t)$ that is sampled by the switch 115 and provide a sample output $P_k$ once every T seconds.

The gain $X_i$ of each variable gain amplifier 110 is referred to herein as a tap gain. It has been known to determine the tap gain $X_i$ settings by applying an iterative rule to a sequence of widely spaced test pulses $Z_0$. One example of an iterative rule that can provide satisfactory tap gain $X_i$ values is:

$X_i^{r+1}=X_i^r-(a)P_i^r$, except $X_0^{r+1}=X_0^r-a(P_0-Z_0)$ wherein: $X_i^r$ = tap gain at $i$ th tap $X_i^{r+1}$ = corrected tap gain at $i$ th tap $a$ = a scale factor having a magnitude less than 0.1

$P_i^r$ = value of $i$ th sample when the gain at that tap is $X_i^r$ $X_0$ = tap gain at the center tap $P_0$ = value of the center sample $Z_0$ = the known value of the test pulse.

The above rule was known prior to this invention and is applied to FIG. 1 herein in order to set the background for an iterative rule using weighted errors that is novel with this invention. (The weighted error iterative rule of this invention is discussed in connection with the preferred embodiments of FIGS. 2 and 8 which employ digital circuitry, including a digital filter, in lieu of the analog filter 100 and variable gain amplifiers 110 of FIG. 1. However, it should be understood that the weighted error iterative rule of this invention can be applied to analog equalizers such as the one schematically suggested in FIG. 1.)

A typically nearly equalized signal $P_i$ representing a single pulse $Z_0$ is shown in FIG. 1 together with an indication of the value $P_{1n}$ to $P_n$ that are supplied as sample outputs $P_i$.

In this desired response, each $P_i$, except for $P_0$, should be zero, and if the tap gains $X_i$ are properly selected such a state can be achieved. When the output is such that each $P_i$ is zero and $P_0$ equals $Z_0$ then the receiver is said to have been equalized. The value of each sample $P_i$ is influenced by each tap gain $X_i$. Thus the value of the $P_{110}$ sample is affected by each of the 29 tap gain $X_i$ values. However, the tap gain $X_{110}$ has a dominant effect on the sample $P_{110}$. The sample $P_{110}$, itself, is an output error since ideally, and when equalized, $P_{110}$ is zero. However, the tap gain $X_{110}$ error is not proportional to the $P_{110}$ value, because the $P_{110}$ value is influenced by all the tap outputs and thus by all the tap gains. But because the $X_{110}$ tap gain has the dominant effect on $P_{110}$, the $P_{110}$ value was used, in the known rule mentioned above, as correction for the error of the corresponding tap gain $X_{110}$.

If a small correction $(a)$ $P_{110}$ proportional to the magnitude of that error $P_{110}$ is made to the tap gain $X_{110}$ and a comparable operation performed on each tap gain $X_i$, then a new set of tap gain $X_i^{r+1}$ values are obtained. The reference tap gain, which in this case is the center tap gain $X_0$, has to be adjusted based on the difference between the sample $P_0$ value and the known value of the test pulse $Z_0$. Thus the new set of tap gains $X_i^{r+1}$ bear the relationship to the old set of tap gains $X_i^r$ that is expressed in the above equation, namely:

$X_i^{r+1}=X_i^r-(a)P_i^r$, except $X_0^{r+1}=X_0^r-a(P_0-Z_0)$

This process is repeated. Another test pulse $Z_0$ is sent, equalized and sampled. The new sample values are used for another set of tap gain $X_i$ corrections $(a)P_i$. The process is continued until the tap gain $X_i$ values converge to final values, at which point full equalization is achieved and the sample $P_0$ is equal to the test pulse $Z_0$ value.

If data pulses $Z(t)$ are now sent, they will be properly equalized and the output sample values $P_k$ will accurately represent the data pulse $Z(t)$ values.

It should be noted however that there are conditions using the above mentioned known rule under which the $X_i$ values will not converge; primarily when the phase distortion imposed by the low pass filter is very severe. It is one of the purposes of this invention to provide a mechanism and method for assuring convergence no matter how bad the phase characteristics of the line may be.

Figure 2:
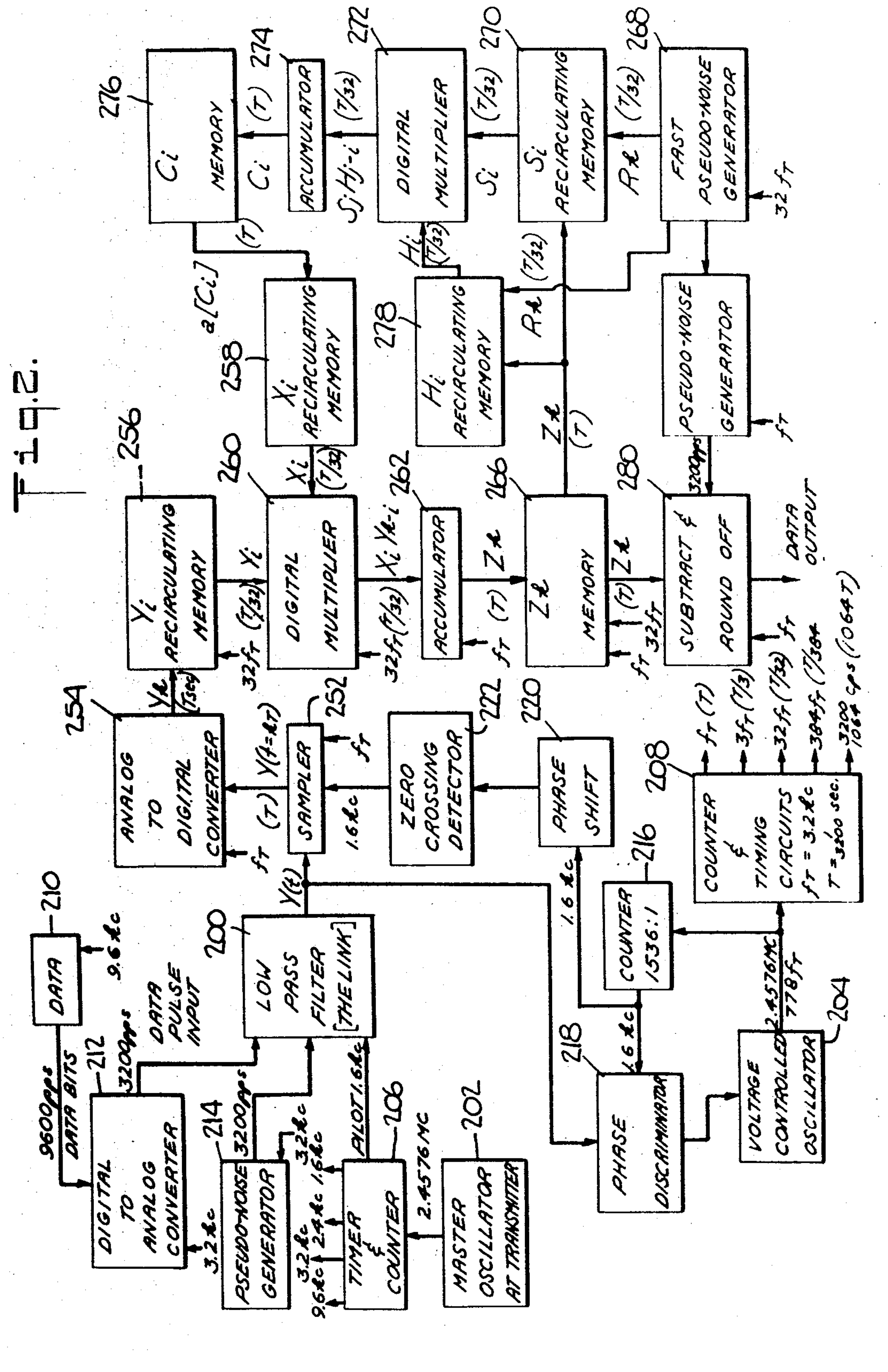

With the above basic concept of the problem involved in mind, it will be easier to comprehend the following discussion of FIGS. 2 and 3, which figures illustrate an embodiment of this invention.

In the FIG. 1 iterative technique for setting the tap gains $X_i$, it was assumed that the equalizing was performed before data was transmitted. A series of very widely spaced test pulses $Z_0$ were transmitted and the appropriate tap gain adjustments $(a)P_i$ made after the transmission of each individual test pulse. In terms of a practical application there are at least two problems with this approach.

First, a constant data flow to the transmitter and from the receiver is desired. Since telephone line characteristics change rapidly enough to require readjustment of the tapped delay line 100 every few minutes, this implies that data buffering is required. Although this is not an insurmountable problem, the complexity of such buffering is quite significant especially when suitable measurement averaging is incorporated to reduce the effects of telephone line noise. Moreover, it is usually necessary that a feedback channel be used to instruct the transmitter when to interrupt data and send the reference signals $P_e$.

Second, in using this technique, the telephone line sees a high duty cycle signal when data is transmitted (i.e., a signal with a low peak-to-average power ratio) while it sees a very low duty cycle signal during the equalization time. This is undesirable since slight line nonlinearities caused by AGC circuits, compandors, modulators, and other potentially nonlinear components can cause errors in the resulting tap gain $X_i$ settings.

These problems may be overcome by transmitting simultaneously with the data signal a pseudo-noise (PN) measurement signal. The estimated errors used in setting the tapped delay line tap gains $X_i$ are then determined by cross-correlating the received signal $Y(t)$ with a locally generated version of the pseudo-noise signal. By using a sufficiently long integration time in the cross-correlation operation the interference due to the data signal and channel noise is effectively eliminated.

FIG. 2—General

The basic system or modem that incorporates this invention is shown in FIG. 2. FIG. 2A is a mathematical description of the operations shown in block diagram form in FIG. 2. The FIG. 2 modem which accomplishes the equalization discussed above employs various digital techniques to achieve equalization. A digital filter is employed to equalize the received information signal. The settings of the digital filter are adjusted and adapted to the link over which the information is being sent by various digital techniques. A reference signal (the pseudo-noise) is digitally cross-correlated to provide estimates of the errors in the digital filter. Corrections to the digital filter are made by processing these estimated errors through digital circuitry that weights and recombines the estimated errors to provide correction factors. The equalization thereby achieved is analogous to that which is achieved by use of a tapped delay line.

The FIG. 2 embodiment is described below, first by a discussion of the transmitting and receiving units up to the point where the digital adaptive equalizing takes place and then by a more detailed description of the adaptive equalization and the units employed to provide equalization and self-adaptation of the equalizing to the link.

The low pass filter 200 includes the link between transmitter and receiver. As will be described further on, this link may be a telephone system. The telephone system may be converted to a low pass filter by means which are well known in this art and are described in connection with FIGS. 4 and 5. Suffice it at this point to accept the fact that a low pass filter 200 is the link between transmitter and receiver.

One of the notational conventions employed in connection with the figures has to do with the manner in which various frequencies and time periods are shown. A master oscillator 202 at the transmitter and another master oscillator 204 at the receiver are both employed to provide a master frequency signal, in the embodiment shown, of 2.4576 megacycles. This master frequency signal is applied to various counter and timing circuits 206 and 208 in order to provide the various signals necessary to operate the units shown in the block diagram. In the embodiment shown, the information pulses (data and pseudo-noise) are generated at a 3200 pulse per second rate. Thus many of the operations that have to be performed require a 3.2 kc. signal so as to provide a basic time period of 1/3200 seconds. The counter and timing circuits 206 and 208 provide this basic frequency. This basic frequency is indicated in the figures as $f_T$ and this fundamental time period of 1/3200 seconds is indicated as (T). For example, the sampler 252 is triggered by an input signal $f_T$ in order to provide a sample $Y_k$ of the continuous input signal $Y(t)$ once each T seconds. The output from the sample 252 is designated as $Y_k$ and the periodicity of output by (T). A corresponding notation is used throughout in which the outputs and inputs for most of the blocks shown are designated by a notation as to their meaning as well as a notation of the periodicity for each pulse or value. The triggering frequencies for most of the blocks are also shown and, it will be noted, that the triggering frequencies are by and large multiples of the basic 3.2 kc. data rate frequency. Indeed, the master oscillator outputs of 2.4576 mc. are a multiple of the basic data rate frequency of 3.2 kilocycles.

It should be understood that in the operation of the various digital circuits other signal frequencies will be required. For example, certain signals required will be a function of the number of bits employed in carrying each of the values in any particular multiplier or memory unit. Such matters as this are within the knowledge of those skilled in the art and will not be dealt with in any detail herein.

At the transmitter, the master oscillator 202 establishes the basic frequency from which the various frequencies necessary for the operation of the system are derived. In the embodiments shown herein the basic frequency is 2.4576 megacycles per second. The master oscillator 202 drives a timer counter 206 which produces the required synchronization and pilot frequencies at the proper phase relation to each other.

Data in binary form is supplied for transmission at the rate of 9600 bits per second from a data source 210. A digital to analog converter 212 converts this data to an eight-level data pulse sequence, thereby bringing the pulse rate down to 3.2 kc. This means that each three data bits are encoded onto a data pulse, the height of the data pulse being the encoding means. There are eight possible combinations of three bits and thus an eight-level data pulse can be used to encode three bits.

A pseudo-noise generator 214 provides a basic reference pulse signal. This reference train of pulses of known, predetermined, sequence and height are the reference against which the receiver can calculate the adaptive adjustments needed to provide an accurate output. By adapting the receiver to provide an accurate reference pulse train output, it follows that the data pulse train output will also be accurate.

The reference pulse signal sequence is in the general form of a two-level sequence and, in particular, is one of the pseudo-noise sequences given in Appendix II, Table 2, p. 169, of Golomb, Baumert, Easterling, Stiffler, and Viterbi, "Digital Communications with Space Applications," Prentice-Hall, Englewood Cliffs, N.J., 1964, Chapters 1 and 8 and Appendix II. This sequence may be generated as described in these pages and in view of what is already known to the art. While for this embodiment the sequence that is 63 pulses long is preferably used, it is believed that any two-level sequence as defined at pp. 51–52 of this work may be used.

Thus the generator 214 provides a 3.2 kc. pseudo-noise pulse train, which train is repeated each 63T seconds. The amplitude of these pseudo-noise pulses conveniently may be $\pm 1/2$ (i.e., 00.10 or 11.10 in the standard twos complement form of binary notation). The two level pseudo-noise pulses (one each T seconds) are added to the eight level data pulses to provide a composite 3200-pulse per second information signal that is transmitted through the low pass filter link 200. The low pass filter link 200 distorts this information signal to provide a distorted information signal $Y(t)$ as the input to the receiver.

A sinusoidal 1.6 kc. pilot tone, employed for synchronization purposes, is also transmitted with the information pulses. This pilot tone controls the frequency and phasing of the master oscillator 204 at the receiver by means of a known phase locked loop type of operation. The master oscillator 204 is a voltage controlled oscillator having a 2.4576 megacycle center frequency. A 1536:1 counter 216 provides a 1.6 kilocycle output when the master oscillator 204 is properly putting out its 2,4576 mc. signal. The two 1.6 kc. pilot tone and 1.6 kc. counter 216 output signals are the two inputs to the phase discriminator 218. The phase discriminator 218 output thereby locks the master oscillator 204 (and thus all the counter and timing circuit 208 outputs) to the phase of the master oscillator 202 at the receiver.

The sampler 252 in this embodiment is timed as follows. In particular, it is not operated to sample at the peak amplitude of the received pulses $Y(t)$. Instead, the 1.6 kc. pilot tone frequency output from the counter 216, which has been phase shifted 90° for the purpose of being supplied to the phase discriminator 218, is phase shifted back at 220 to be in phase with that of the received 1.6 kc. pilot tone. It is then applied to a zero crossing detector 222 which senses the points at which this 1.6 kc. signal (and thus the in-phase pilot tone) goes through zero amplitude. At these points a triggering pulse is released to the sampler 252 to cause it to sample.

The first, and a minor, advantage of this technique for controlling the sampling is that the sampler 252 samples when the pilot tone is zero and this eliminates the need for a filter. It also allows the pilot to be placed lower in the spectrum which might be more convenient in some applications. It also allows the data signal band width to be increased since guard space is not needed for this pilot frequency above the signal band width (and below the frequency limit of the connecting link). This advantage is of particular importance when the invention is applied to telephone line links as in the FIG. 4 and 5 embodiment.

The more significant advantage of this method of sampling is that it solves a problem which has plagued the prior art. The problem is that for some low pass filters containing as a part thereof a phone line, the equalizers are previously used have succeeded in compensating more or less for the data pulse distortion at the tap outputs but they have left and in a sense generated a large problem tail. See Lucky, supra, FIG. 9.

The nature of the problem can best be seen by reverting to FIG. 1 wherein widely separated reference pulses are presumed to be used (that is, pseudo-noise is not used). The problem tail appears beyond the samples that are collected for equalization. Then, when the system is thought to be equalized and data is again transmitted, the tail appears in the data to cause error. This illustrated in FIG. 1A, in which the $P_i$'s are sampled outputs of a test pulse from the equalizer.

This problem is solved in an intuitive way by an operator when the tap gains or gain factors are adjusted manually. The operator observes the output of the test pulses, widely spaced, on a scope and, if the problem tail is present, then he adjusts the gains by trial and error until, while only approximate equalization is obtained throughout the length of the tapped delay line, the problem tail is minimized. This approach is not suitable in application to an automatic system for, first, the automatic system attempts to achieve perfect equalization. Second, it would be cumbersome to automate the procedure of sampling the tail of a test pulse outside the length of the line and adjusting the coefficients $X_i$ so as to strike a good compromise. Furthermore, where the data is not interrupted in an embodiment using pseudo-noise and adjustments are made while data is being received, the tail of a particular pulse in a sequence appears in the next repetition of the sequence, along with the next repetition of that particular pulse in the next sequence and it has been found that, as a general rule, the pseudo-noise equalization cannot equalize both large pulses at once.

It has been thought that the problem has been caused by the sampling technique of the prior art which has been to sample at the maximum of the peak pulse generated at the receiver by the transmitted pulse. To sample at the maximum of this peak pulse sometimes is, depending upon the phase distortion of the low pass filter in question (particularly the distortion in the vicinity of the frequency $f_T/2$) to sample so as to require that the digital equalizer (which is in a sense an inverse low pass filter) have nearly infinite gain at the frequency $f_T/2$). This is physically impossible and it has been found that the problem tail is a result.

The automatic systems of the present invention solve this problem by selecting sampling times by which the tail problem is avoided for all lines in a systematic fashion. These systems operate as follows:

The 1.6 kc. pilot tone is phase controlled so that its zero crossover points at the transmitter are in the center of the data pulses. In other words the pilot is phase shifted about a quarter cycle of 90° from the data at the transmitter and if the data has a periodicity of T, the pilot must have a frequency one-half that of the data and thus a periodicity of 2T. This frequency must be exactly $f_T/2$if it is to be transmitted continuously and used to directly control the timing of the samples. It need only be approximately one-half of $f_T$ if it is to be used to approximate the phase distortion of a $f_T/2$ frequency caused by the connecting link and if this information is to be indirectly used to control the phase of the sampler's sampling.

Thus, the properly phased sampler 252, samples the continuous incoming signal $Y(t)$ once each T seconds to provide a voltage magnitude $Y(t=kT)$ once each T seconds. The sampling for all practical purposes is instantaneous. Instantaneous sampling can be achieved by feeding the continuous input $Y(t)$ through a closed switch to a capacitor. The triggering signal from the zero crossing detector 222 then opens the switch at the appropriate instant and the voltage value $Y(t=kT)$ is available from the capacitor.

The analogue to digital converter 254 then converts this sample value $Y(t=kT)$ into a binary indication $Y_k$ of the signal $Y(t)$ magnitude at the moment of sampling.

FIG. 2 — Adaptive Equalization

The following description of the adaptive equalization is presented in more detailed form than is the rest of the description herein because the rest of the equipment shown or described is known in the art or, at the least, previously known to others as well as myself.

The input to the low pass filter 200 includes a 3.2 kc. data signal, a 3.2 kc. pseudo-noise signal and a 1.6 kc. pilot tone signal to provide a low pass filter 200 output $Y(t)$. For the purposes of this discussion of equalization, we can ignore the 1.6 kc. pilot tone. As described above, sampling takes place when the pilot tone passes through zero so that the sample 252 output $Y_k$ is affected only be the data and pseudo-noise pulses. If sampling is to take place at some other point in the pilot tone cycle it is necessary to subtract off the known errors introduced thereby.

Thus it is appropriate to say that the continuous information signal $Y(t)$ is composed of a series of pseudo-noise pulses added to the series of data pulses. This information signal $Y(t)$ however is distorted by having been passed through the link 200. The distorted information signal $Y(t)$ is sampled once each pulse period T to provide a series of sampler 252 outputs $Y(t=kT)$. An analog to digital converter 254 converts these $Y(t=T)$ information signals to digital values $Y_k$ which are received and stored in the $Y_i$ recirculating memory unit 256.

By a means that is known as digital filtering the sample values in the recirculating memory unit 256 are multiplied by various coefficients $X_i$ that are stored in the recirculating memory unit 258. The digital multiplier 260 and accumulator 262 perform this digital filtering function by multiplying sample $Y_i$ values by coefficients $X_i$ values and summing them in the fashion called for by Equation (1) of FIG. 2A to provide equalizer output sample $Z_k$ values. When the coefficient values $X_i$ are correctly derived, the equalizer outputs $Z_k$ will be properly equalized and will correspond to the heights of the information pulses $Z(t)$ that are produced at the transmitter end of the system. The equalization compensates for the distortion caused by the link 200.

These equalizer output $Z_k$ values contain, in addition to the desired data, a value corresponding to the level of the pseudo-noise signal applied at the transmitter. Accordingly, a pseudo-noise generator 264, which has been synchronized with the transmitter pseudo-noise generator 214, is employed to subtract off the pseudo-noise values so as to provide data output.

The equalizer output $Z_k$ values are held in a recirculating memory unit 266 and, because these $Z_k$ values also include pseudo-noise information, they form the basis for checking out whether or not the coefficients $X_i$ have the desired values. This is done by cross-correlating a sequence of $Z_k$ values with a series of pseudo-noise pulses $R_k$ generated from the fast pseudo-noise generator 268 in accordance with the procedure described in Equation (3) of FIG. 2A. The multiplication and summation called for in Equation (3) takes place by virtue of the way in which the $Z_k$ and $R_k$ values are fed to the $S_i$ recirculating memory unit 270. Suffice it to say at this point that by a method of cross-correlation, expressed in Equation (3), a series of values which are termed herein estimated error $S_i$ values are provided.

These estimated errors $S_i$ are then weighted by certain preset weights $H_i$ according to the procedure called for in Equation (4) of FIG. 2A to provide a series of correction $C_i$ values. The multiplication and summation procedures shown in Equation (4) are carried out by the digital multiplier 272 and accumulator 274, respectively.

As a consequence, the correction values $C_i$ are stored in a $C_i$ memory unit 276. A reduction factor "*a*,", of the order of one thirty-second, is applied within the $C_i$ memory unit 276 to provide appropriately reduced output values $a(C_i)$ which are the actual correction factors applied to the corresponding coefficients $X_i$ in the memory unit 258, see Equation (2).

In this fashion, the sequence of (1) cross-correlation between the equalizer output $Z_k$ and the pseudo-noise generator output $R_k$ and (2) proper weighting of the cross correlation products $S_i$ provides a series of correction factora $a(C_i)$ for the basic coefficients $X_i$, which ultimately cause these coefficients $X_i$ to converge to those values that will provide fully equalized output $Z_k$.

Important to this convergence is the manner in which the individual weights $H_i$ are obtained and this is described in greater detail further on.

The $X_i$ memory unit 258 has capacity for 29 $X_i$ values and thus retains 29 coefficients $X_i$.

The $Y_i$ recirculating memory unit 256 is designed to circulate 29 successive $Y_k$ values. By analogy, it is like a tapped delay line having 29 taps. Once each T seconds, a new $Y_k$ value is added and the oldest $Y_k$ dropped. Thus each T seconds, each sample $Y_k$ value moves up one in the memory unit 256. It also follows that a given $Y_k$ input is in the memory unit 256 for 29T seconds.

The digital multiplier 260 operates so that once each T seconds each of the 29 sampled pulse $Y_i$ values in the memory unit 256 is multiplied by a separate one of the coefficients $X_i$ in the memory unit 258. It is convenient if the time period for each such multiplication is T/32 seconds. Since only 29 values are multiplied each T seconds, this means that the output of the multiplier 260 is a blank for three of the T/32 seconds periods each T seconds.

The subscript notation in Equation (1) indicates which $X_i$ value is multiplied by which $Y_i$ value. For example, the center $X_i$ value, i.e., $X_0$ (which is the largest coefficient) always multiplies the center $Y_i$ value. Thus a given $Z_k$ has as its primary component the $Y_k X_0$ product, where $Y_k$ corresponds to $Z_k$. The other components of that given $Z_k$ are the products of the other 28 coefficients $X_i$ and the corresponding 14 preceding and 14 succeeding $Y_k$ values (i.e., $Y_{k\pm i}$). In connection with Equation (1) it should be kept in mind that the $Z_k$ provided at the output of the accumulator 262 at any one instant corresponds to the $Y_k$ that *n*T seconds earlier was at the $Y_0$ position in the $Y_i$ recirculating memory unit 256.

The accumulator 262 stores the 29 $X_i$ $Y_i$ products generated each T seconds and adds them together to provide a modified sampled pulse output $Z_k$ value once each T seconds.

If the coefficients $X_i$ in the memory unit 258 are properly set, then the $Z_k$ value at the accumulator 262 output will accurately represent the amplitude of the corresponding information pulse that was fed into the low pass filter 200. That is, equalization will be obtained.

Since the information pulse was modified in amplitude by one of the pseudo-noise pulses supplied by the generator 214, that modification must be undone in order to provide accurate data output. The pseudo-noise generator 264 and subtract circuit 280 perform this function. Subtract circuits of this sort are discussed by Grabbe, Ramo and Wooldridge, supra, at pp. 8–11.

The 29 slots for the memory units 256 and 258 are selected to provide adequate equalization for the range of distortion expected from the type of link with which the adaptive equalizer is expected to be used. Poorer links will require more equalization. The greater equalization may be achieved by using larger capacity memory units 256, 258 and more coefficients $X_i$.

In Equation (1), the indication $X_{i0}=\delta_{i,0}$ means that at the outset, the coefficients $X_i$ are preset so that $X_0^{\circ}=1$ and all the rest of the $X_i^{\circ}$ values are zero. This condition is required for proper calculation of the weights $H_i$ as will be described further on.

Each output information $Z_k$ value is retained in the $Z_k$ memory unit 266 for T seconds. The memory unit 266 has two outputs. One outputs provides a $Z_k$ value to the subtract circuit 280 and the other output supplies the same $Z_k$ value for cross-correlation with the pseudo-noise $R_k$ sequence. The $Z_k$ output value changes once each T seconds.

When the connection between the receiver and transmitter is first made, the coefficients $X_i$ in the memory unit 258 will normally be very much different than is desired. Furthermore, during the course of transmission, the characteristics of the low pass filter 200 may vary, as is typically the case where telephone lines form all or part of the low pas s filter 200. In order to arrive at correct $X_i$ values and to keep such $X_i$ values continuously revised, the following adaptive process takes place.

If the coefficients $X_i$ were all correct for the condition of the link 200, then no further correction would be needed. But as the link condition changes, the equalization must be revised. In effect there are errors in $X_i$ values. Since the $Z_k$ values carry a component of a known pseudo-noise sequence it is possible to make an estimate of the errors in the equalizer output, from which corrections to the $X_i$ coefficients can be calculated. This estimate is the sequence of 29 $S_i$ values.

These estimated errors $S_i$ are obtained by the cross-correlation of a sequence of output values $Z_k$ and the pseudo-noise sequence $R_k$ according to the relationship shown in Equation (3).

Because the pseudo-noise sequence is a repeated 63 pulse sequence, it becomes necessary to run the cross-correlation through an integral multiple of 63T seconds. Furthermore a large number of cross-correlation cycles is desirable to assure that the link 200 noise and the data (which data is noise to the known pseudo-noise sequence) interference are effectively eliminated. The summation range in Equation (3) is over 16P time periods T, that is 1008 T seconds. The summation range where *k* goes from MPV+1 to MP(V+1) is 1008, where $P=63$ (the time period of the pseudo-noise sequence) and $M=16$.

The value of M need not be 16. But a value of M near 16 appears to be a good compromise between the undesirable consequences of a much smaller or a much larger M. In either case, that is if M is made either much larger or much smaller than its optimum value, the net result is a longer time to obtain convergence of the coefficients $X_i$. Roughly, the reasons why this happens are as follows.

If M is made very small, then each estimate of $S_i$ is poorer and the scale factor must be reduced. Thus many more estimation-correction cycles must be gone through before equalization is achieved. When the $C_i$ values are being calculated (that is, the Equation (4) processing is going on) then no estimating of errors $S_i$ can be made. Thus many correction cycles means a lot of "down-time" calculating $C_i$ values and, in all, a longer time before equalization is attained.

If M is made very large, then we find that even though the total number of correction cycles or steps is decreased, that decrease does not compensate for the increased time duration of each estimation-correction cycle, In addition, a larger M requires larger units and adds cost without speeding equalization.

In connection with the magnitude of M in Equation (3), two other points should be kept in mind. First, the magnitude of the scale factor "$a$" must be kept roughly proportional to the magnitude of M. The size of M affects how good are the estimates $S_i$ and the corrections $(a)C_i$ made to the coefficients $X_i$ must be scaled accordingly. The larger is M, the better is the estimate and the more accurate are the correction values; thus the larger may the scale factor "$a$" be. Second, the optimum value for M is a function of the transmitting power used for pseudo-noise transmission. The M of 16 illustrated was found useful in an embodiment wherein the pseudo-noise power equalled the data power. The greater the pseudo-noise power, the smaller need M be to obtain equivalently accurate estimates $S_i$.

Equation (3) shows that the calculation of estimated error $S_i$ values involves three separate (or, at least, separable) terms. The first term is a summation term that is the actual cross-correlation of $Z_k$ and $R_k$ values. The second term is a cross-correlation of the $Z_k$ values with pseudo-noise values that are 31T removed from the $Z_k$ values. By this means this invention provides a simple and effective technique for eliminating data bias and the inherent pseudo-noise bias. Specifically and for example, Equation (3) means that a given information pulse, say $Z_{100}$ is multiplied against the pseudo-noise pulse $R_{131}$, which pulse is riding on the $Z_{131}$ information pulse. The cross-correlation called for by this second term is between pulses so far (i.e. 31T) removed from one another that there would be negligible intersymbol interference. Thus the result of such cross-correlation would provide a measure of the average data level. By subtracting this second term from the first term, the result is estimated error $S_i$ values which are based on the cross-correlation of the pseudo-noise sequence portion of $Z_k$ with the locally generated pseudo-noise sequence $R_k$. Obviously, the time distance between the pulses cross-correlated in the second term of Equation (3) need not be 31T as long as they are sufficiently removed from one another to render intersymbol interference negligible.

The third term in Equation (3) is the "$\delta_{i,o}$" term. This is simply an indication that the piece of pseudo-noise data that is being measured by the cross-correlation process must be subtracted out since the estimated error $S_o$ at the center of the sequence is the difference between the measured value and the known value of the pseudo-noise pulse.

The second term in Equation (3) could be eliminated if the data bias were otherwise taken care of. For example, a data scrambler at the transmitter (which would require a synchronized unscrambler at the equalizer output) could make it possible to assure that the data averaged to zero. Then there would be no data bias and thus no need for the cross-correlation between $Z_k$ and $R_{k+31}$. Similarly, it might be possible to subtract out the data output from the $Z_k$ values going to the $S_i$ memory 270 and thus eliminate data bias by eliminating the data component of the information pulse $Z_k$ values.

Furthermore, there is an additional inherent bias term caused by the fact that the 63 pulse pseudo-noise term, because it is an odd number of pulses per cycle, averages to a small value other than zero. The second term in Equation (3) automatically takes care of this bias as well as the data bias. Without an implementation of the second term (the cross-correlation with $R_{k+31}$) it would be necessary to put in a bias term to cancel the inherent pseudo-noise bias.

The $R_k$ output from the fast pseudo-noise generator must be synchronized with the pseudo-noise output from the generator 214 in the transmitter. The manner of synchronization is discussed in connection with the obtaining of the weight $H_i$ values since the synchronization must take place in order to calculate these $H_i$ values.

The method of calculating correction factors ($C_i$) for the 29 coefficients $X_i$ involves first making 29 error estimates $S_i$, which estimates are then weighted in the manner called for by Equation (4) to provide the correction values $C_i$.

It is Equation (3), the terms of which are discussed above, that describes the technique employed in FIGS. 2 and 3 to obtain these estimates errors $S_i$.

It is difficult to give a word description of exactly what it is that Equation (3) designates. Roughly, Equation (3) indicates that the value of each data pulse $Z_k$ is used as the basis for multiplying a 29-pulse sequence portion of the 63 pulse pseudo-noise sequence $R_k$ to provide 29 $Z_kR_k$ products in each T seconds. Each of the 29 $Z_kR_k$ products are added into a separate one of the 29 slots in the $S_i$ memory 270. Then the next $R_{k+1}$ pulse is multiplied against a 29-pulse sequence of $R_k$ values which overlaps by 28 $R_k$ values the immediately preceding 29 $R_k$ values. Each T seconds the 29 $R_k$ set shifts by one pulse within the overall 63-pulse sequence. After 63T seconds, the first 29 $R_k$ set is repeated.

More particularly, assume that we are calculating the estimated error $S_{14}$. In order to calculate $S_{14}$, a series of 1008 data pulse $Z_k$ values are multiplied one each T seconds against 1008 successive pseudo-noise pulse values $R_{k114}$. The particular pseudo-noise pulse $R_{k114}$ employed for each multiplication is related to the data pulse $Z_k$ by the subscript notation indicated. Assume that in the sequence of 1008 data pulses $Z_k$ under consideration that the $Z_{75}$ is being multiplied to provide one of the values which goes into the summation that provides the estimated error $S_{14}$. The pseudo-noise pulse $R_{k114}$ employed will be that pseudo-noise pulse added to $R_{61}$ at the transmitter. The number 61 comes from the $k-j$ subscript, that is 75 minus 14. In order to make sure that the proper pseudo-noise pulse is multiplied against the received data pulse $Z_k$, the pseudo-noise generator 268 in the receiver has to be synchronized to the pseudo-noise generator 214 in the transmitter.

Since there are 29 estimated errors $S_i$ to be calculated, it is necessary that at least 29 of the pseudo-noise pulses in the 63-pulse sequence be available each T seconds for multiplication against each data pulse $Z_k$ so as to provide one of the terms for each of the 29 summations that Equation (3) indicates is required in order to obtain the 29 estimated errors $S_i$. A fast pseudo-noise generator 268 is therefore required. This fast pseudo-noise generator 268 generates pseudo-noise pulses having a period of T/32 seconds. For 29 of these T/32 seconds, the fast pseudo-noise generator 268 generates 29 pseudo-noise pulses in sequence and for the next 3T/32 seconds, the fast pseudo-noise generator steps ahead by the rest of the sequence so as to be able to start all over again with the next data pulse $Z_k$. Actually, the fast pseudo-noise generator 268 steps ahead by one less or one more than the rest of the 63-pulse pseudo-noise sequence since it is essential that the portion of the pseudo-noise sequence applied to successive data pulses $Z_k$ shift by one pulse in order to stay in step with the fact that the next successive $Z_k$ carries the next successive pseudo-noise pulse. In the practical embodiment illustrated, it makes instrumentation easier to run the pseudo-noise sequence backward and to therefore step ahead one less, rather than one more than, the complete sequence of 63 pulses. However, this latter point is an instrumentation detail which, although significant to simplify circuitry, is a matter of choice as far as the basic concept is concerned. After a large number of successive $Z_k$ values have been operated upon in this fashion, the 29 separate summations provide 29 separate estimated errors $S_i$. There is nothing critical about employing 1008 successive $Z_k$ values as illustrated in this embodiment but it is important that a number of successive $Z_k$ pulses be a multiple of the number of pulses in the pseudo-noise sequence.

It might be noted that the FIG. 2 block diagram shows the $Z_k$ values and the $R_k$ values as applied directly to the $S_i$ recirculating memory unit 270 while Equation (3) indicates that multiplication and summation functions are performed in calculating the estimated error $S_i$ values. Yet no digital multiplier or accumulator units are shown. A digital multiplier is not necessary since the values of the pseudo-noise signals $R_k$ are powers of two so that, in binary form, all that is involved is shifting the binary point of each $Z_k$ value and then multiplying by a +1 or −1 depending on whether $R_k$ is positive or negative. No accumulator is necessary because these $Z_k$ $R_k$ products are fed directly to the appropriate slots in the $S_i$ memory unit 270.

Each of the 29 slots in the memory unit 270 has capacity for a 24-bit number. The individual $Z_k R_k$ product values are added to the least significant 12-bit portion of each of the appropriate 24-bit slots. After the appropriate number of summations (that is, after 1008 successive information $Z_k$ values have been cross-correlated) then the 12 most significant bits are fed out from the memory unit 270 as the estimated error $S_i$ values for further processing described herein.

Thus it is a more accurate reflection of the equipment design to indicate the recirculating memory unit 270 as the unit which provides multiplication and summation as well as the memory function. It is true that careful attention has to be paid to the design of the memory unit 270 so that these functions are all performed but such design considerations as are required are known to those skilled in this art.

More specifically, the pseudo-noise pulses $R_k$ have the magnitude ±2. Thus when multiplying the equalized output $Z_k$ by the fast pseudo-noise $R_k$ all that is done is that a binary point shift is made by tapping in at the appropriate point of the shift register in the $S_i$ recirculating memory unit 270. For this reason, no multiplier is shown in the block diagram. A shift register is employed and is in effect a multiplier where one of the two numbers being multiplied is, in the binary system, any power of 2.

Equation (3) also calls for the cross-correlation of information $Z_k$ values with the $R_{k+31}$ pseudo-noise value. This latter operation is not directly shown in FIG. 2. The reason for this is that the estimated error $S_i$ recirculating memory unit 270 is designed so as to pick out and store the $R_{k+31}$ value of the pseudo-noise sequence during each cycle so that it is available to be appropriately subtracted from each of the pseudo-noise $R_k$ values and therefore provide the appropriate resultant estimated error $S_i$. The first two terms of Equation (3) can be combined and the equation written as:

$$S_i^r=\frac{1}{M(P+1)}\sum_{k=MPV+1}^{MP(V+1)} Z_k^v(R_{k-i}-R_{k+31})-_{i,e} \qquad (3')$$

From the above rewritten equation it can be seen that the $R_{k+31}$ value can be picked out and subtracted from each $R_k$ to provide a modified pseudo-noise sequence that is multiplied with the $Z_k$ values.

The technique of using pseudo-noise that is transmitted along with the data pulses makes it possible to avoid interrupting the data in order to make corrections to the coefficients $X_i$, which corrections are required if the modem is to track with changes in the transmission characteristics of the telephone line or whatever other link is involved.

By means of the above technique for obtaining the 29 estimated errors $S_i$, each estimated error $S_i$ is more influenced by one coefficient $X_i$ than by any other. In particular, $S_{14}$ is influenced more than any other $S_i$ by the 14th cooefficient $X_{14}$. Similarly and correspondingly, the 14the coefficient $X_{14}$ is affected more by the estimated error $S_{14}$ than by any of the other estimated error $S_i$ calculated by means of the above process. Yet, and this is important, each estimated error $S_i$ affects each coefficient $X_i$ to some extent.

An alternate to the exact embodiment in FIG. 2 has been suggested above in connection with the discussion of the second term in Equation (3). It was suggested that the data might be subtracted from that output of the $Z_k$ memory 266 which is used for Equation (3) cross-correlation. (This is the output applied to the $S_i$ memory 270). Under such an arrangement, with an appropriate bias added to cancel the inherent bias in the pseudo-noise, it would be possible to eliminate the correlation with $R_{k+31}$. More importantly, the elimination of data from the cross-correlation estimate of error $S_i$ will make the estimate of error $S_i$ more accurate. It should be noted that the $S_i$ calculated is an estimate of what was deemed $P_i$ error values in connection with the FIG. 1 discussion. The main reasons the $S_i$ values differ from the $P_i$ values is that data noise and system noise throw off the estimates $S_i$ obtained by cross-correlation. The subtraction of data from the output being cross-correlated will improve the estimate $S_i$ and bring it closer to the $P_i$ error value. Then it is possible to use a larger scale factor "*a*" (without changing the M value) to provide larger correction factors $(a)C_i$ for the coefficients $X_i$. As a consequence, the time it takes to equalize is reduced.

Throughout, this invention is discussed in terms of its effect on the convergence of the coefficients $X_i$. Thus employment of the technique of weighting the error estimates $S_i$ by weights $H_i$ (in accordance with the Equation (4) procedure) to provide coefficient $X_i$ corrections $C_i$ always leads to convergence of the $X_i$ values. It should be understood that convergence used in this context means that the average value for each $X_i$ becomes constant. Due to the technique employed in which only estimates $S_i$ of errors are obtained and in which noise throws off any individual estimate, it is inevitable that the $X_i$ values will fluctuate slightly. But if each $X_i$ has a constant average value about which it fluctuates and if the fluctuations are small then the error rate of the data output can be kept to a minimum.

The calculation of the correction values $C_i$ is made as shown in Equation (4) from an appropriate weighting of the estimated error $S_i$ values with a set of weights $H_i$. The significance of Equation (4) can better be appreciated after an understanding is had of how the weights $H_i$ are calculated.

Suffice it to point out here that a series of weight $H_i$ values is obtained and stored in the recirculating memory unit 278. At a T/32 second rate, one estimated error $S_i$ value and one weight $H_i$ value are multiplied together in the digital multiplier 272 and the product $S_jH_{ji}$ held in the accumulator 274 until a $C_i$ value has been calculated. After 29 successive $S_jH_{ji}$ multiplications, the corresponding $C_i$ value will have been obtained and the accumulator 274 places it in the $C_i$ memory 276. At that point, the correction factor $(a)C_i$ can be applied to the corresponding coefficient $X_i$ or the $C_i$ memory 276 can hold the $C_i$ value until the whole set of 29 correction $C_i$ values are obtained and then make the corrections to the coefficient $X_i$ values.

Since 29 $S_jH_{ji}$ products are required to provide one correction $C_i$ value, one $C_i$ value is calculated each T seconds and for three of the T/32 periods each T seconds no $S_jH_{ji}$ products are produced.

FIG. 2 — Weight $H_i$ Calculations

When a modem receiver is first employed, it is necessary to develop an initial set of weights $H_i$ for storage in the $H_i$ recirculating memory 278. Once these weights $H_i$ have been developed, they are retained unchanged for long periods of time. It may periodically be desirable to reestablish these weights particularly where the telephone lines being employed have been greatly changed. But essentially, once calculated the weights $H_i$ remain constant and can be employed without change even though the distortion imposed by the connecting link changes with time as long as the change in distortion is not too extreme. As a practical matter all telephone lines have similar gross transmission properties and thus an appropriate set of weights $H_i$ for one telephone line will be effective to assure convergence for many telephone lines and certainly for most lines of the same schedule.

Therefore, it would be possible for these weights $H_i$ to be preset in some arbitrary fashion that reflects the typical and likely errors that are found in data transmission over the type of link being employed.

In any case, a preferred modem will contain a "synch" button to permit the operator to develop a new set of weights $H_i$ whenever he wishes to do so. He may not have to obtain a new set of weights more often than once every few days but the ability to develop a new set when required or desired is important.

The purpose of obtaining weights $H_i$ and then weighting the estimated errors $S_i$ in order to provide correction values $C_i$ (one procedure for doing this being described in Equation (4)

) is in order to improve the performance of the iterative technique of correcting the coefficients $X_l$.

Two systems of weights $H_l$ are described herein for the embodiment of FIGS. 2 and 3. One system which is the one to which Equation (4) is directed assures convergence of the $X_l$ values no matter how poor are the transmission characteristics. The other system of weights is described briefly below and has the advantage of achieving convergence much more quickly than has hitherto been possible.

With reference to FIG. 2 and to Equation (4) the manner in which the weights $H_l$ are derived is basically a cross-correlation between the equalizer input samples $Y_k$ and an appropriate pseudo-noise sequence $R_k$. Equation (5), which describes this cross-correlation shows $Z_k^o$ values rather than $Y_k$ values. The reason for Equation (5) designating $Z_k^o$ values is that the implementation of this invention shown in FIG. 2 picks off these values at the output of the $Z_k$ recirculating memory k266. Thus, it is important to note that Equation (5) is accurate only where the $Z_k$ values (which are employed for calculating the weights $H_l$) are those $Z_k^o$ values obtained when the coefficients $X_l$ have a special initial setting. This initial setting is one wherein the $X_l$ values are preset so that all of the $X_l$ values are zero except for $X_o$ which is set at 1. At this initial setting of $X_l$ values the $Z_k$ equalizer output samples equal the input samples $Y_k$. This condition for $Z_k$ is indicated in Equation (5) by the superscript "o"; thus $Z_k^o$.

The multiplication and summation functions which are called for by Equation (5) in the calculation of the weight $H_l$ values are performed by the $H_l$ recirculating memory unit 278 in much the same fashion as these functions are performed by the $S_l$ recirculating memory unit 270. Thus there is no need to repeat the above discussion which has been put forth concerning the memory unit 270 except to point out that the memory unit must be designed with the same considerations in mind.

When starting up the modem of this invention, the operator pushes the "synch" button to preset the $X_l$ values (all to zero except $X_o$ which is preset to 1) and connect the $Z_k$ memory 266 output and fast pseudo-noise generator 268 output to the $H_l$ recirculating memory unit 278. These input connections to the $H_l$ memory 278 are not maintained after the $H_l$ values are obtained and the modem is processing information pulses to provide output data.

Thus on pressing the synchronization button, the fast pseudo-noise generator 268 starts up and the calculation according to Equation (5) proceeds. However, there is only one chance in 63 that the fast pseudo-noise generator 268 will put out a pseudo-noise sequence in synchronism with the pseudo-noise sequence carried by the information values $Z_k$. Since it is known that the $H_o$ value will be by far the largest $H_l$ valve, what is done is to incorporate a means for observing which of the slots in the $H_l$ recirculating memory 278 build up fastest. A threshold detector set to a value of approximately one-half the expected $H_o$ value will suffice for this purpose. It is known that the $H_o$ value will build up to approximately "1" as a final figure. One of the slots in the $H_l$ memory 278 will build up to this threshold of approximately one-half. That slot is identified and its distance from the desired $H_o$ position employed to shift the fast pseudo-noise generator has been shifted into synchronism, then all the $H_l$ values are wiped out and the Equation (5) cross-correlation started all over again. Since the fast pseudo-noise generator 268 has been shifted into synchronism, the $H_l$ values will now build up in the appropriate slots in the $H_l$ recirculating memory 278.

Once the fast pseudo-noise generator 268 has been synchronized, the regular pseudo-noise generator 264 can be readily synchronized.

The number of $H_l$ values required for weighting (and the number of $S_l$ and $C_l$ values) is determined by the size of the digital filter 256, 258, 260, 262. A digital filter with 29 weighting coefficients $X_l$ requires 29 correction factors (*a*) $C_l$ which in turn are based on 29 estimated errors $S_l$. The 29 estimated errors $S_l$ are to be weighted by weights $H_l$, which weights $H_l$ in turn represent the amount of intersymbol interference at each position and are developed for each memory unit position by use of unequalized information pulses $Y_k$.

Inspection of Equation (5) will show that $4n+1$ or 57 $H_l$ values are required for calculation of the $C_l$ values. Thus, during the initial period when $H_l$ values are being calculated, the fast pseudo-noise generator 268 operates in a somewhat different mode than during data processing. Essentially it puts out the entire 63-pulse $R_k$ sequence, one $R_k$ pulse each T/32 seconds. This means that 2T seconds are required to run through one cross-correlation cycle. Since the $Z_k^o$ value will shift in the middle of the 2T time period, the fast pseudo-noise generator must be stepped back (or ahead, depending upon manner of implementation) one $R_k$ pulse at the instant when the new $Z_k^o$ value comes along.

Because all 63 $R_k$ values are provided, it is possible to obtain 63 $H_l$ values. But only 57 $H_l$ values are needed and thus six $H_l$ values are dropped when the system switches to the operate mode. These six $H_l$ values are the three furthest removed in each direction from the center weight $H_o$.

To obtain useful values of $H_l$, it is necessary to run through a large number of cross-correlations. The number specified in Equation (5) is QP. This means that the fast pseudo-noise generator runs through its 63-pulse sequence $R_k$ 8,064 times. This requires essentially 5 seconds. In addition there is the time it takes to first synchronize the fast pseudo-noise generator 268. As a result, in one practical embodiment, the total synchronization and measurement time required nearly 8 seconds. It will frequently be possible to obtain adequate $H_l$ values with an appreciably smaller number of cross-correlation cycles, i.e., Q in Equation (5) may be reduced to one-half or even one-third of the value indicated.

A comparison of Equation (5) with the first term of Equation (3) and a comparison of the circuit positions of the $H_l$ memory 278 and $S_l$ memory unit 270 will show that the $H_l$ and $S_l$ values have a similar system relationship. By using these $H_l$ values obtained when there is no equalization to weight the estimated errors $S_l$ when there is equalization, a very useful type of correction values $C_l$ is obtained. Specifically, correction values $C_l$ are provided that will cause the coefficients to converge no matter how poor are the phase distortion characteristics of the low pass filter 200. However to obtain this universal convergence the relation between the $H_l$ and $S_l$ values must be that prescribed by Equation (4). This relationship is discussed in more detail further on in connection with the discussion of FIG. 3.

The calculation of the weight $H_l$ values requires a memory unit that will retain many more decimal places than is necessary for the recirculating memory 278 once the $H_l$ values have been obtained. The reason for this is that each $Z_kR_k$ calculation in Equation (5) provides a very small value. These very small values, however, must be held in a memory unit and added up over the 8,064 time periods T. Once each T seconds, a $Z_kR_k$ value is provided for each of the $H_l$ slots. These individual $Z_kR_k$ values are extremely small but over 8,064 periods they add up to the more significant values which are the weights $H_l$. After the $H_l$ values have been calculated, the least significant places may be dropped and the more significant values are retained in the $H_l$ recirculating memory unit 278 for use during the operation of the modem. But since very small $Z_kR_k$ values must be held during the process of calculating the $H_l$ values, it becomes necessary that the $H_l$ recirculating memory unit 278 be extensive in size. A significant saving in design components may be had by incorporating portions of the $S_l$ and $X_l$ memory units 270 and 258 into the $H_l$ memory unit 278 during the synchronization period. This will provide the extensive $H_l$ memory required during synchronization. At the end of synchronization, when the least significant parts of the $H_l$ values have been dropped, these components are then switched back to perform their function in the memory units 270 and 276 during data processing.

FIG. 3

FIG. 3 represents in basic block diagram form, the adaptive equalizer which is at the heart of this invention. With some understanding of FIGS. 2 and 2A, the following brief description of FIG. 3 can be understood and will aid in focusing on the novel error weighting feature which is fundamental to this invention.

With reference to FIG. 3, the analog to digital converter 254 produces the output discussed above, namely a series of digital values $Y_k$ representing the sample values taken once each information pulse received (that is, once each T seconds). The digital filter 300 provides the equalization that compensates for the distortion in transmission so as to provide an output value $Z_k$. The digital filter 300 performs the function of Equation 1 of FIG. 2A. These $Z_k$ values are fed to the $Z_k$ recirculating memory unit 266 so that they will also be available for cross-correlation with a pseudo-noise pulse sequence $R_k$. This digital filter 300 is constituted in FIG. 2 by the $Y_i$ memory 266, the $X_i$ memory 258, the multiplier 260 and the accumulator 262.

As described previously, in order to obtain a data output without the pseudo-noise value that was added to the data at the receiver, a pseudo-noise generator 264 provides a pseudo-noise train of pulses that are subtracted from the equalized information pulses $Z_k$ in a subtract and round off unit 280. The pseudo-noise train from the generator 264 is synchronized with the pseudo-noise train added at the transmitter in the fashion described under the discussion of FIG. 2.

A fast pseudo-noise generator 268, which has been synchronized with the pseudo-noise generator at the transmitter in the fashion described previously, provides a sequence of pseudo-noise pulse values $R_k$ that are cross-correlated with each information pulse value $Z_k$ in a cross-correlator unit 305. The cross-correlator 305 performs the function of Equation 3 of FIG. 2A to provide and hold estimated error values $S_i$. The cross-correlator 305 is constituted in FIG. 2 by essentially the $S_i$ memory unit 270.

A sequence of predetermined weights $H_i$ are maintained in the recirculating memory unit 228. These weight values $H_i$ are multiplied against the appropriate estimated error values $S_i$ held in the cross-correlator 305. This multiplication of $H_i$ and $S_i$ values and the summation of the resulting products in accordance with the procedure specified in Equation 4 of FIG. 2A takes place in the error weighting unit 310. With the appropriate scale factor "*a*" applied by the unit 310, the output of the unit 310 is a series of correction factor values $a(C_i)$ having whatever magnitudes are necessary to revise the coefficients $X_i$ in the digital filter 300 so as to maintain proper equalization of the input values $Y_k$. The error weighting unit 310 performs the function of Equation 4 in FIG. 2A as well as to add on the scale factor "*a*" indicated in Equation 2 of FIG. 2A. This error weighting unit 310 is constituted in FIG. 2 by digital multiplier 272, accumulator 274 and $C_i$ recirculating memory unit 276.

Thus, it may be seen from FIG. 3 that the mode of adaptation of an equalizer of this invention involves a weighting of the estimated errors $S_i$ in such a fashion that an estimated error $S_i$ which corresponds to coefficient $X_i$ is substantially modified in order to provide the correction value $C_i$ for that particular coefficient $X_i$.

Each estimated error $S_i$ contributes to the calculation of each correction value $C_i$ (see Equation (4)). Furthermore, about half of the weights $H_i$ contribute to the calculation of each correction value $C_i$. The span of weights $H_i$ that contributes to the calculation of each $C_i$ shifts by 1 as $C_i$ shifts by 1. For example, with reference to Equation (4), the ninth correction value is calculated by the following set of $S_i$ and $H_i$ values:

$$C_9 = \sum_{j=-14}^{14} S_j H_{j-9} \qquad (4')$$

Thus the span of $H_i$ values employed is $H_{-23}$ to $H_5$ (a span of 29 $H_i$ values including $H_0$). Similarly, the span of $H_i$ values used in calculating $C_{10}$ is $H_{-24}$ to $H_4$. As $C_i$ shifts by "1," the 29 span set of $H_i$ values employed shifts by 1.

With reference to Equation (4), consider (as an example) the ninth coefficient $X_9$ which is corrected by the ninth correction value $C_9$. In calculating $C_9$, by use of Equation (4), we can see that the ninth estimated error $S_9$ will be weighted by the center weight $H_0$ (because $H_{9-9}$ is $H_0$). The calculation of weights $H_i$ (as discussed in connection with FIGS. 2 and 2A) is such as to provide the largest value for the center weight, namely $H_0$. Thus the estimated error value $S_9$ which corresponds to the correction value $C_9$ is given the greatest weight because $H_0$ is greater than any other value of $H_i$.

As mentioned above, the estimated error $S_i$ associated with each coefficient $X_i$ has some effect on the correction value $C_i$ for each of the coefficients. The effect of any given estimated error value $S_i$ is greatest on the correction value $C_i$ applied to the corresponding coefficients $X_i$. But it is essential that each estimated error $S_i$ be used in calculating each correction value $C_i$ in order to obtain universal convergence of the coefficient $X_i$ values.

It is further important that the set of $H_i$ values used in Equation (4) calculations have the relationship to the estimated error $S_i$ values and correction $C_i$ values as indicated in Equation (4). It is that relationship which assures universal convergence.

With reference to FIG. 3 it is convenient to describe a second useful system of weights $H_i$. The weights in the $H_i$ recirculating memory 278 are made equal to the coefficients $X_i$ and applied to the estimated error $S_i$ values in accordance with the following equations:

$$C_i^r = -\sum_{j=-n}^{n} S_j^r H_{i-j}^r \, ; \; |i-j| \le n \qquad (6)$$

$$H_i^r = X_i^r \qquad (7)$$

Implementation of this Equation (6) requires that the $H_i$ values be updated whenever the $X_i$ values are updated. Otherwise the equipment and implementation discussed in connection with FIG. 2 applies.

This second system of calculating and employing weights $H_i$ is limited to $2n+1$ instead of $4n+1$ weights because there are only $2n+1$ coefficients $X_i$. Thus when $i-j$ has an absolute magnitude greater than "n," the value employed is zero and there is no contribution to the summation.

Equations (1), (2) and (3) of FIG. 2A apply equally well to a modem incorporating this second system of weights. Equation (6) above replaces Equation (4) and the simple Equation (7) replaces Equation (5).

The advantage of the Equation (6) and (7) system of weights is that it provides very fast equalization. It would appear to provide a useful equalization technique where information pulses are transmitted through the air over radio waves. The rapid changes in transmission characteristics that radio transmission, particularly in the H.F. range, faces requires rapid as well as continuous adaptation.

The weighting techniques of Equation (4) and of Equation (6) can be used no matter what is the method of estimating, calculating or measuring equalizer errors. Thus either weight systems can be used where the equalizer errors are measured by a series of widely spaced reference pulses (see FIG. 1 discussion). Even where a perfect measure of error is obtained, this technique of using weights on the errors would still be desirable to in one case assure convergence and in the other case speed convergence.

From this description of how weight $H_i$ values are obtained, it can be seen that the calculation of correction $C_i$ values, in accordance with Equation (4), involves a weighting of each estimated error $S_i$ with an $H_i$ value that is spaced from the $S_i$ value by an amount that corresponds to the amount the $C_i$ value being calculated is spaced from the center position (i.e. $C_0$, $X_0$, etc.).

The weighting technique of Equation (6) shows a similar spacing between the $S_i$ and $H_i$ values being multiplied together exists. With both methods of using weights, the weights involved are stepped from the $S_i$ each is multiplying by the amount of the subscript of the $C_i$ being calculated. Where the $C_i$ being calculated is $C_9$, then each $S_i$ is multiplied by an $H_i$ nine "subscripts" away. But note that the direction these nine subscripts are in differs as between Equations (4) and (6). In the first case $C_9$ is the sum of 29 $S_i H_{19}$ products and in the second case $C_9$ is the sum of 29 $S_i H_{9-i}$ products.

Weighting in General

The invention, as does the prior art, employs error values for forming corrections $C_i$ for the variable coefficients $X_i$ of an adaptive equalizer. The error values may be formed by comparing the actual output of the equalizer with a locally known or developed indication of what the output of the equalizer should have been.

According to the invention, to form a correction for any given coefficient, a sum is taken of a set of weighted error values. The weights may be chosen or formed in various ways to produce various desired effects but generally they will represent the extent of signal distortion caused by imperfections in the particular link involved. Universal convergence of the equalizer settings may be achieved by obtaining for each correction value a set of at least as many error values as the coefficients, these error values representing the deviation of the actual equalizer output from the desired equalizer output. Each of these error values is weighted by a weight obtained from the unequalized input to the equalizer, the weight having the sliding relationship to the error values as suggested by the example of Equation (4). For very rapid but not universal convergence, other weights or a different number of error values may be employed as suggested by the example of Equation (6). Equations (4) and (6) show that weights may either by computed and stored for a considerable period or may be varied continually.

An understanding of the operation of the invention is difficult for persons unfamiliar with mathematical presentations. Considerable assistance may be obtained however from the fact which is well known that error values, e.g., estimates $S_i$ as produced by the embodiment of FIGS. 2 and 3, may be treated as error values produced when an isolated test pulse proceeds through an equalizer with the equalizer visualizer as an analog or digital tapped delay line. (Error values obtained by other means of calculation may likewise be treated). The error value $S_{1n}$ can thus be considered to be formed at time $-n$ when the largest portion of an isolated test pulse coincides with the position of the first tap, $X_{1n}$, of a tapped delay line (nearest the point where the signal enters). Similarly, the error value $S_{1n+1}$ can be considered to be formed at time $(-n+1)$ when the largest portion of an isolated test pulse coincides with the position of the second tap $X_{1n+1}$, and so on.

Proceeding with this understanding of the $S_i$, the relationship of the error values to the equalizer coefficients can be understood from the following discussion. At the time $-n$ the leading tail of the test pulse will reside deeper in the memory of the equalizer. i.e., at taps $X_{1n11}$ ... $X_o$ ... $X_n$. Because the main body of the pulse is at $X_{1n}$, it can be seen that if the error value $S_{1n}$ is not zero, then the dominant portion of that error value, to the greatest degree of probability, is caused by an erroneous setting of the coefficient $X_{1n}$ * But since any given equalizer output error is formed by the algebraic addition of signals appearing on all taps, and a plus error of one coefficient can cancel a negative error of another, then sometimes $X_{1n}$ might need correction when $S_{1n}$ equals zero—or might not need correction when $S_{1n}$ is not zero.

According to the invention disclosed herein, the correction value for the setting of coefficient $X_{-n}$ is formed from the sum of weighted equalizer output errors. In the example this allows the use of each of the errors to "vote" for a correction of any coefficient, and thus accommodates the interdependency of the errors of the equalizer. Error value $S_{-n+1}$ although reflecting in greatest probability the erroneous setting of coefficient $X_{-n+1}$* also reflects to a certain degree any error in the setting of coefficient $X_{-n}$, and similarly other errors $S_{-n-2}$, $S_{-n+3}$ . . . . are relevant to $X_{-n}$. Proceeding with the example, it has been found advantageous to base the weight to give these errors in correcting $X_{-n}$ upon the degree of signal distortion (intersymbol interference in the case of digital transmissions) that is experienced between positions $-n$ and $-n+1$ for error $S_{-n+1}$; between $-n$ and $-n+2$ for error $S_{-n+2}$, and so on, and the invention would comprehend the use of any set of weights, no matter how selected, which represent to some degree the interference of the particular link involved.

At time $-n$, the main body of the pulse which then lies at position $-n$ is multiplied by the setting of the tap coefficient $X_{-n}$, and forms a term in the output of the equalizer $Z_{-n}$, all other terms being formed from tail values at the other taps, multiplied by the respective coefficients. Equally, if $X_{-n}$ is in error, the value of the main body of the pulse is multiplied by that error and forms a term in the error value $S_{-n}$ which is a summation of all such error terms. Note for the same size of error in coefficient $X_{-n}$ and in any other coefficient, $S_{-n}$ will be more affected by the error of $X_{-n}$ because it only is multiplied by the main body of the pulse, all others being multiplied by tail values. Similarly, at time $-n+1$ the main body of the pulse will be at position $-n+1$, and is the probable dominant influence on $S_{-n-1}$.

(It will of course be understood that for any equalizer no one set of correction values will properly set up the equalizer. Rather, a large number of corrections with successive sets of correction values are employed. Furthermore, where the values are calculated in the presence of data, only a small scale factor ($a$) may be used for each correction C, requiring an even larger number of interations.).

An important further feature of the invention is the development of weighting values from values at the equalizer input as illustrated by the examples of equations 4 and 6. The person unfamiliar with mathematical presentations may perhaps obtain an understanding of the import of these equations with the aid of the next discussion. Equation 4 of FIG. 2A is as follows:

$$C_i^v = -\sum_{j=-n}^{n} S_j^v H_{j-i} \text{ wherein } |i| - n$$

The superscript $v$ denotes merely the particular set of correction values being formed, and the particular set of error values being used. The sigma sign denotes that for any particular correction value $C_i^v$ (one being needed for each coefficient $X_i^v$) a sum is to be taken of a weighted value of each error value $S_j^v$ in the range of $j=-n$ to $n$. The symbol $|i| \leq n$ denotes that the subscript $i$ ranges from $-n$ to $+n$. The term $H_{j|i}$ denotes a sliding relationship in which a given error value is weighted by successive weights in forming the sums for successive correction values.

Equation 5 of FIG. 2A describes how the weights $H_i$ are formed for the embodiment shown using a cross correlation between the equalizer input samples and the locally generated pseudo-noise reference signal.

Just as it is true that the error estimates $S_j$ may be treated as error values produced as an isolated test pulse proceeds through the equalizer, it is also true that the values $H_i$ obtained by equation 5 of FIG. 2A may be treated as values obtained from the distorted test pulse itself, prior to equalization. Thus, the equivalent of equation 5 using an isolated test pulse would be $H_i = Y_i$ where $Y_i$ is obtained by sampling the unequalized test pulse i time units away from the main body of the test pulse.

In other words, the test pulse that has been distorted is sampled at time increments T to provide the weights. The sample $Y_o$ is equal to the dominant portion of the test pulse which arrives at tap $X_o$ at time O; $Y_{1n}$ is that portion of the leading tail of the distorted signal which appears n spaces ahead of the main body of the pulse, and sample $Y_n$ is that portion of the trailing tail which appears n spaces behind the main body of the pulse.

The reader may see that equation 4 of FIG. 2A for calculating the correction value $C_{1n}$ for tap $X_{1n}$ by substitution becomes $$C_{-n}=-\sum_{j=-n}^{n} S_jH_{j-n}=-\sum_{j=-n}^{n} S_jY_{j-n} \qquad (4^2)$$

$$C_{1n}=-(S_{1n}Y_o+....S_o\,Y_n+....S_nY_{2n}) \qquad (4^3)$$

Since $Y_o$ is the main body of the pulse, it comprises the largest weight; and when calculating the correction to $X_{1n}$, it is used to weight error value $S_{1n}$ which is the strongest indicator of the amount of correction needed by $X_{1n}$.

Observe that tap position 0 is $n$ spaces ahead of tap—$n$. Thus, by weighting $S_o$ (which mostly is an indication of the need of correction of $X_o$ but has been affected by $X_{1n}$) by the weight $Y_n$ which indicates the amount of tail that can be present at tap—$n$ when the main body of the pulse is at tap 0, $S_o$ is weighted in accordance with the degree that its value can be affected by (and thus can indicate) an erroneous setting of $X_{1n}$. By further such examples the reader will be able to observe that because of the "sliding" relationship denoted by ($j$—$i$) the term $Y_{j1i}$ is useful to weight the error values $S_j$ when a correction for $X_i$ is being calculated.

It has previously been noted that correction values as defined by equation 4 of FIG. 2A will cause the coefficients X to converge no matter how poor are the phase distortion characteristics of the low pass filter and equation 6 defines a more rapid weighting technique based upon the observation that for many links, the values of the varying coefficient themselves will serve adequately as an indication of the extent of interference. The particular weight is assigned to the particular error value using the same sliding weight considerations as mentioned above, the weights however continuously varying as the equalizer operates.

As was indicated above, in its broadest scope the invention comprehends in general the use of weighting of error values and taking sums thereof to form correction values.

Figure 7:
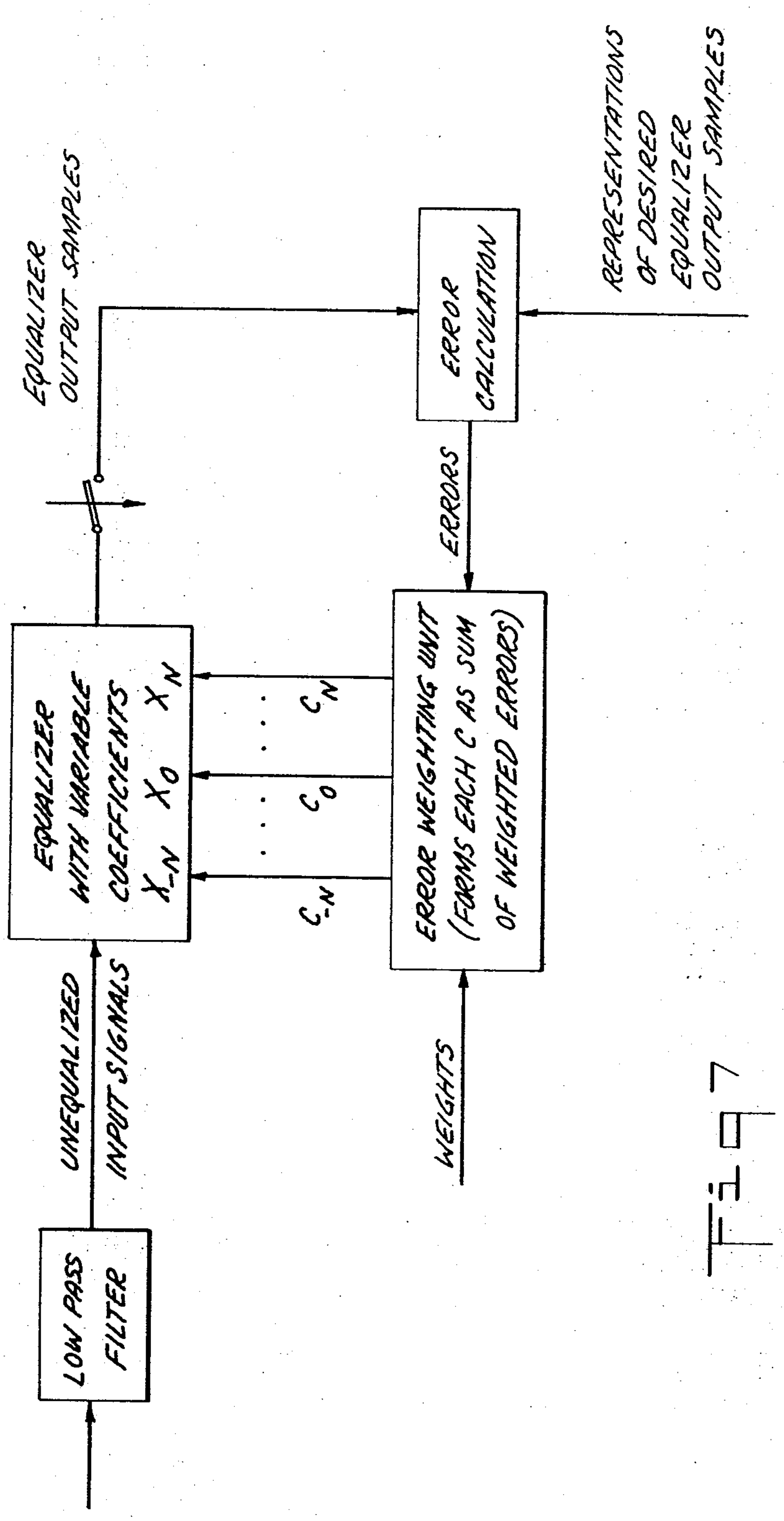
FIG. 7 is a generalized block diagram illustrating the weighting techniques of the invention.

FIG. 7 is provided to give a visual representation of the generality of the invention.

The general equations applicable to equalizers using either analogue or digital tapped delay lines are (see also the first two equations of FIG. 2A):

$$\text{the output of the equalizer}=Z_k^r=\sum_{i=-n}^{n} X_i^rY_{k-i};$$

denoting that the output $Z_k$ is an algebraic sum of input samples $Y_{k1i}$ multiplied by adjustable coefficients $X^r_i$ and, an updated coefficient$=X_i^{r}{}_+{}^1=X_i^r+aC_i^r)$ denoting that the correction value $C_i^r$ is multiplied by a scale factor before being added algebraically to the outdated coefficient.

The generality of the invention entails recognition of the fact that the weighting equation 4 of FIG. 2A must be generalized to take in account that the total number of taps need not be even, the main tap need not be at the center, the number of error values to be employed for any one correction need not be $2n+1$, the use of pseudo-noise or isolated reference pulses are only two of the means of providing error values, the use of pseudo-noise or isolated reference pulses are only two of the means of providing the weights, and finally even, in some instances, the use of the sliding relationship of the weights to the error values (denoted by $j$—$i$) is only one of the means that may be employed to provide the weights.

Further Examples of Equalization With Weighting In The Presence of Data

To obtain useful error values when operating in the presence of data the data must in some way be made to appear random to the error measuring circuit. As is known this may be achieved in at least three ways—the data may in fact be random, it may be scrambled so as to look random to the measuring circuit, or a random-appearing reference signal may be added to the data and the measuring circuit operates only on the reference signal with the data appearing random to the circuit.

Using any of these techniques, the instantaneous output of the error measurement circuit is affected by the data present at that instant, and valid equalizer coefficients are produced from the error measurements only by means of averaging over time whereby the effects of the data averages to zero.

In the procedure of the invention (of determining error values, weighting them to obtain correction values, and applying the correction values to the coefficients) averaging of the data may be performed either prior or subsequent to weighting. In either case the averaging may be accomplished only partially prior to application of the correction factors to the coefficients. The remaining averaging of the effects of the data occurs as the successive correction factors are applied to the coefficients. Indeed the weighted errors themselves (without averaging) can be applied, as they are generated, to the coefficients and the averaging can occur entirely as adjustment of the coefficients continues. A suitably small scale factor ensures that the coefficient will not be unduly perturbed as the data averaging takes place.

The preferred embodiment according to Equations (3), (4) and (5) of FIG. 2A which uses pseudo-noise has the formats of being able to work with arbitrary input data formats without the use of a data scrambler. For this purpose the pseudo-noise (a random appearing reference signal) was utilized for measuring the error values as well as for establishing the weights. While Equation (4) sets forth the error weighting, Equations (3) and (5) merely set forth the use of the pseudo-noise. Much of the averaging to remove data was accomplished prior to weighting, although some was done by use of a small (one thirty-second) scale factor in applying the correction values to the coefficients, as indicated by Equation (2).

Another preferred embodiment according to the following equation depends upon the data being random or made so by a scrambler, and in this case some of the averaging is accomplished immediately after weighting, while much is also accomplished via a small scale factor as the coefficients are adjusted.

The equation for this embodiment is $$C_i^r=1/K\sum_k (Z_k^r-D_k)y_{k-i} \qquad (8)$$

As before, $C_i^r$, is a correction factor for the $i$ th tap, if the equalizer is visualized as a tapped delay line. The superscript $v$ indicates the current or $v$ th step of forming correction factors from the output of the equalizer.

The averaging of the data after weighting is denoted by the factor $1/k$. The size of $k$ to be selected depends upon the amount of averaging desired prior to adjustment of the coefficients for a given application, and other design parameters. The value of $K$ establishes the number of the weighted error terms in the sum.

The equalizer output error values are given by the expression ($Z_k^r$—$D_k$) in which the $Z_k^r$ are the actual equalizer output samples and the $D_k$ are the representations of the desired equalizer output samples.

The weights are given by the term $Y_{k1i}$, thus indicating that the weights are taken directly as equalizer input samples.

If this equation is compared with the equation given in FIG. 2A it will be seen that the terms ($Z_k^r$—$D_k$) of Equation (8) together with the subsequent averaging denoted by the term $1/k$ serves the same function as Equation (3) of FIG. 2A. It will also be seen that the terms $Y_{k1i}$together with the subsequent averaging achieved by $1/K$ serves the same function as Equation (5) of FIG. 2A.

The preferred embodiment of FIGS. 8 and 9 is constructed according to Equation (8) in much the same way that the preferred embodiment of FIGS. 2 and 3 is constructed according to the equations of FIG. 2A. Like numerals refer to like elements in these figures.

By comparison of FIG. 9 with FIG. 3 it will be seen that the apparatus is substantially the same, with the following exceptions. Since no pseudo-noise is utilized elements 264, 268 and 305 are omitted, and the decision unit 280' merely rounds off the $Z_k$, to arrive at the output data values $D_k$.

Corresponding output values $D_k$ are subtracted from the $Z_k$ and these are employed directly as the error values. The use of the output data itself can be recognized as a valid procedure because of the probability that the rounded off value truly represents the transmitted value.

The error values are applied to the error weighting unit 310'. The weights $Y_k$ which are also applied to this unit are available directly from the input signal as shown, and thus the weight memory 278 of FIG. 3 may also be omitted.

Turning now to FIG. 8 and comparing with FIG. 2 it will be seen that both embodiments comprise a digital equivalent of a tapped delay line in which stored input signals $Y_i$ are multiplied by stored coefficients $X_i$, and the accumulated products form the equalizer output $Z_k$. In FIG. 8 however the pseudo-noise circuitry of FIG. 2 is omitted from each side of the link.

The round off unit 280', discussed above for FIG. 8, is again shown in FIG. 9. Its output $(Z_k - D_k)$ is applied directly to the digital multiplier 272. The weights $Y_{k\pm i}$ are taken from the $Y_i$ memory and applied to multiplier 272. The corrections obtained from the multiplier 272 may be applied to a $C_i$ memory 276, shown in dotted lines, just as is done in FIG. 2. In this case averaging could be accomplished prior to change of the coefficients $X_i$. In solid lines the corrections are shown applied directly from the multiplier to the $X_i$ memory. In this case the $X_i$ are changed immediately, each change being made sufficiently small (by choice of a suitably small scale factor) so that the individual corrections do not basically perturb the $X_i$, and averaging is accomplished over time, as the $X_i$ are repeatedly corrected.

Referring to FIG. 10, additional details are shown for the case where the correction factors are not fully developed before being applied to the coefficient $X_i$. Rather each term of the correction factor (indicated as $\Delta C_i^r$) is applied to the appropriate coefficient as it is produced, and only after K such applications is the effect of a full correction factor felt. Because of the small scale factor, this incremental correction does not unduly perturb the coefficients until the averaging has taken place.

It will be understood that the equalizer embodiment of FIG. 8–10 can be used with the modulation and demodulation circuits of FIGS. 4 and 5, to be described below, with no change other than elimination of the pseudo-noise generator 214 of FIG. 4.

The equalizers of FIGS. 8, 9 and 10 may be viewed as embodiments of a more general category of equalizers, namely: adaptive equalizers (of the general type described with adjustable coefficients) in which the digital data is equalized while the equalizer is updated, the input data itself serves as the weights, the error values are formed by subtracting from the equalizer output a corresponding value based on quantized output samples (obtained from the decision device that operates on the equalizer output), and correction values are a general function $f_1$ of the sum of weighted terms and the terms are a general function $f_2$ of the error values.

In the embodiments presently contemplated the particular function $(f_1)$ of the sum may be considered as a design parameter chosen in accordance, among other things, with the convergence characteristics to be achieved. The function $(f_2)$ of the error values, among other things, is chosen in accordance with the type of instrumentation and efficiency desired.

In either case it is contemplated that most construction should employ functions ($f_1$ and $f_2$) which may be described mathematically as being odd, monotone nondecreasing functions each of which is zero when its argument is zero. The general equation may be stated as follows, employing symbols defined herein:

$$C_i^r = f_1[1/K \sum_k f_2(Z_k^r - D_k) Y_{k-i}] \qquad (9)$$

Implementation of this general rule is illustrated in FIG. 8*a* in which the memory 276 of FIG. 8 has been deleted and additional function calculating units 277 and 279, along with an accumulator 278 have been incorporated which calculate the functioned relations defined by $f_1$ and $f_2$. Note that when $f_1$ is defined by $f_1(x)=x$ and when $f_2$ is defined by $f_2(x)=x$, this equation becomes Equation (8).

Implementation of equation (9) may be simplified for instance (albeit with loss of other features) by choice of other functions. Mention may be made, for instance, of an embodiment in which $f_2(x)$= sign of $x$. The block diagram of FIG. 8 illustrates this embodiment by simply substituting for the true multiplier 272 a device which multiplies by plus or minus 1, depending upon the sign of the quantity $(Z_k^r - D_k)$.

Initial Setup of The Equalizer set-up

In the embodiment originally presented (FIGS. 2 and 3) it was contemplated that the equalizer would be set-up initially in the presence of received data. The result was that a relatively long set-up time (e.g. three minutes) was required to enable averaging of the data. Initial set-up procedures can also be implemented by using isolated test pulses, but these also are slow. For many applications it has been found desirable to reduce the set-up time. To achieve this, the data is interrupted at the transmitter, and an increased energy level, known, random-appearing reference signal (e.g. pseudo-noise) is sent. At the same time the scale factor (term "a" in Equation (2) of FIG. 2A) is increased to a value of one-half, thus significantly increasing the equalizer set-up speed. After a short period such as 5 seconds the transmitter is switched to transmit data and a normal reference signal, and the receiver scale factor is returned to normal value. Following this the equalizer continues to adjust itself but much more slowly, and this operation can continue indefinitely.

For a rapid initial set-up procedure of the embodiment of FIGS. 8, 9, and 10, it is also necessary that a known random-appearing reference signal be received. This may comprise a known data sequence or it may be a simple test signal generated independently of the data source. During the time that this signal is being received the correction factors may be fully formed before being applied to the coefficients and a relatively large scale factor may be used. After this initial training period of a few seconds the transmitter is switched to normal operation and the scale factor is returned to normal value. The equalizer will then continue to adjust itself during operation.

The initial set-up procedures just described can be applied to the setup of an adaptive equalizer utilizing the general weighting concept of equation 9.

Referring to FIG. 8*b* the equalizer indicated by FIG. 8*a* is shown connected to the set-up mode. This involves simply substituting at the transmitter a reference sequence generator 212*a* for the converter 212 of FIG. 8 and at the receiver substituting a subtraction circuit 280*a* for the round off circuit 280' and providing a reference sequence generator 212*b* whose output is identical to the reference sequence generator 212*a*. As usual the term $Z_k$ is the equalizer output (in this case as the reference sequence is received) and $D_k$ is the desired equalizer output (in this case the locally generated replica of the transmitted sequence). The sequence generators 212*a* and 212*b* must provide random-appearing sequences which occur at a pulse rate such that at least two individual pulses of the sequence appear in the equalizer at any instant (preferably a pulse rate equal to the data pulse rate). For any function $f_1$ and $f_2$ this initial set-up procedure offers the advantage of a greatly increased set-up speed (by a factor of ten or more) over that offered by an isolated test pulse scheme when the setup must be done in the presence of noise.

Adaptation To A Phone Line

FIGS. 4, 5 and 6 illustrate various additional equipment required and desirable for the proper operation of a modem embodying this invention with a telephone line as the link between receiver and transmitter. FIG. 4 illustrates the additional equipment needed at the transmitter. FIG. 5 illustrates the additional equipment required at the receiver. FIG. 6 illustrates certain additional equipment that it is preferred to have at the receiver in order to compensate for what has been called carrier frequency jitter. It should be understood that FIGS. 4, 5 and 6 presume the presence eo of the equipment shown in FIG. 2 (or that of FIG. 8 with the changes noted above) and only enough of the FIG. 2 equipment is shown to permit ready tie-in to the FIG. 2 system.

The data source 210 is assumed to supply data in the form of binary bits at a pulse rate of 9600 pulses per second. The reference pseudo-noise sequence generator 214 supplies a reference pulse to the adder 405 at a pulse rate of one every T seconds, T equaling 1/3200th seconds.

The output from the data source 210 is fed to the digital-to-analog converter 212. This converter 212, like the one described in Grabbe, Ramo and Woolridge, supra, at p.30–05, converts the information carried by the input bits to discrete pulse levels. The output of the converter 212 is preferably a series of immediately adjacent pulses, each pulse having a height dictated by a span of input bits. If there are eight discrete amplitude heights (ranging from minus to plus) which each pulse can have within the power input that can be accepted by the phone link and still be accurately deciphered at the receiver, each three input data bits can be encoded as the height of a single pulse. In other words, three bits of information can be carried by a single pulse and by this technique the rate at which information is carried is increased. However, the use of a pulse height encoded system requires accurate transmission so that each received pulse cannot only be clearly distinguished from an adjacent received pulse but can also be accurately measured as to its height. The less distortion that occurs in the transmission or, alternatively, the greater the compensation at the receiver for the distortion in the transmission, the more discrete pulse levels can be used and the greater the information rate at which information can be transmitted.

The adder 405 adds the pilot tone, the eight level data pulse input and the reference two-level pseudo-noise pulse input to produce a pulselike signal having as its amplitude at any instant the sum of the amplitudes of these three components at that instant.

A sharp cutoff low-pass filter 410 receives the output of the adder 405 and supplies it to a balanced modulator 415. It is important that the filter 410 have a sharp upper cutoff point because it is desired to supply as much of the total data pulse spectrum energy to a balanced modulator as is possible without supplying frequencies too high to be modulated on the carrier. The carrier is selected at as high a frequency as possible for telephone line transmission. Since lower side band transmission over the telephone line will be employed, and according to a refined embodiment by which a pilot tone is transmitted just above the carrier, the carrier is about 2.5 kc.

The balanced modulator 415 serves the function of modulating the information signal pulses (which it might be noted are the sum of the data pulses and the pseudo-noise pulses) and the pilot tone for AGC control, timing, and sample phasing onto a carrier, the carrier being normally within the range of 21/2kc. to 3 kc. for use with telephone or cable circuits. The 2.4 kc. carrier signal is derived from the timing counters 206 (see FIG. 2). For a discussion of balanced modulators, see Landee, Davis & Albrecht, *Electronic Designers Handbook*, McGraw-Hill, Inc. (1957), pp. 5–25.

Balanced modulators inherently suppress the carrier, and yet the carrier in this case must be recoverable at the receiver in order to control the balanced demodulator at the exact frequency which the carrier has at the receiver. This frequency will vary slightly but significantly due to the phone system multiplexing, etc.

To ensure that there is sufficient carrier at the receiver to permit its recovery for this purpose, the data for this embodiment of the invention in which a carrier is used must have in its analog form a nonzero DC level.

It is necessary to modulate the information onto a carrier if it is desired to transmit over the telephone line because the telephone line has a band-pass within which it is necessary to transmit and thus the output of the low-pass filter 410 has to be stepped up to a frequency band within the band-pass range of the telephone system. The modulator-demodulator system and phone line 425 of this FIGS. 4 and 5 embodiment is generally analogous to the low-pass filter 200.

The output of the modulator 415 is passed through a sharp cutoff band-pass filter 420 so as to transmit only one sideband, in this case the lower sideband, to the telephone line 425.

More generally, the band-pass filter 420 must have relatively sharp cutoff so that the input signal being fed to the telephone line 425 has no frequencies outside of the telephone line 425 band-pass. This is important not only because of telephone companies' insistence that signals be within the band-pass but because signals having frequencies outside of the band-pass tend to produce crosstalk and other problems in the system, some of which may interfere with the data transmission. At the same time, and since the faster the pulse rate the wider the pulse bandwidth, it is desirable to make the cutoff band-pass filter 420 as sharp as possible to obtain as broad a bandwidth as possible consistent with the criteria that it must be within the phone line band width.

An impedance (not shown) is used to match the output of the filter 420 to the impedance of the telephone line 425. On the receiver end, a similar impedance match would normally be incorporated.

At the receiver (see FIG. 5), after impedance matching, a sharp cutoff band-pass filter 505 is employed to eliminate noise and other irrelevant phone line 425 output that is outside of the band of frequencies carrying the transmitted information.

The filter 505 output is amplified by an amplifier 510 that has an automatic gain control feature to correct gross distortion in amplitude to provide a suitable signal amplitude for demodulation by a balanced demodulator 515 and to insure that the signal $Y_k$ amplitude reaching the analog-to-digital converter 254 (see FIG. 2) will be sufficiently high to permit good resolution by the analog-to-digital converter 254. In other words, the particular converter 254 used has a ten bit capacity which enables it to encode an analog pulse as any one of 1024 digital values. The received signal should be amplified so that the range of pulse levels received covers most of the range of digital values. On the other hand, if the pulse level falls too low, and is bunched at the bottom end of the range of the converter 254, there will be only a relatively small number of the over 1000 potential levels available to resolve the differences in pulse amplitude.

A narrow band-pass filter 525 has a band-pass sufficiently narrow to pick out the 1.6 kc. pilot tone from the demodulated output of the low-pass filter 520. This pilot tone is then detected by an envelope detector 530 and then fed through a low-pass filter also shown at 530 to bias the AGC amplifier 510 in a direction and to an amount necessary to maintain the output of the demodulator 515 at a reasonably constant amplitude. This can only be an approximate adjustment, however, since the AGC amplifies the input to maintain a reasonably constant level for the 1.6 kc. pilot tone frequency. The other frequencies present in the information pulses may be attenuated more or less than the pilot tone and consequently the final and accurate amplitude or system gain control is achieved by the adaptive equalizing discussed above, particularly in connection with FIG. 2.

The balanced demodulator 515 steps down the data and reference pulse information from a frequency range in the band-pass of the filter of the telephone system to the low frequency range which it initially had at the transmitter before modulation.

A phase locked loop including a phase discriminator 530 and a voltage controlled oscillator 540 having the 2.4 kc. carrier frequency as its center frequency extracts the carrier frequency from the output of the amplifier 510 so as to accomplish balanced demodulation at that frequency.

The importance of providing a means such as a phase locked loop for recovering the carrier signal from the input to the demodulator 515 rather than generating a carrier signal locally that would be equal in frequency to the carrier generated at the transmitter rests in the fact that the telephone system transmission techniques frequently operate in such a fashion as to cause a shift in the frequency of the carrier being transmitted. For example, in the course of transmission through the telephone system, the signals are sometimes modulated on various carriers and then demodulated at remote locations from the modulation point by demodulators whose frequency is not accurately fixed to the modulator frequencies. This introduces a frequency shift which, though it is ordinarily only a few cycles per second and seldom runs to more than 20 c.p.s., would result in considerable distortion of the data signal as it is received as compared to the sensitivity of the receiver according to this invention if the data signal were recovered by a demodulator 515 operating on a carrier frequency that was not adjusted to reflect the frequency shift.

In general, the phase locked loop for carrier recovery operates similarly to the phase locked loop (oscillator) 204, counter 216 and discriminator 218) used for recovery of the 1.6 kc. pilot tone (see FIG. 2). Any frequency offset in the carrier will be reflected as a frequency offset in the derived carrier signal for the balanced demodulator and the output of the demodulator will not be distorted by virtue of being run at a frequency which is other than the center frequency for the band of data being transmitted.

In particular, the voltage controlled oscillator 540 of the phase locked loop is built to have a center frequency equal to the carrier frequency of 2.4 kc. The output of the AGC amplifier 510 and the output of the voltage controlled oscillator 540 have their phase (and thus frequency) compared by the discriminator 525 to provide a "DC" signal having a magnitude equal to the difference in phase between the output of the voltage controlled oscillator 540 and the carrier signal from the AGC amplifier 510. The signal is called DC because its rate of change of phase is slow compared to the frequency of the oscillator 540. This "DC" signal provides a control signal for the voltage controlled oscillator 540, which control signal operates to cause the output of the oscillator 540 to be equal in frequency to the carrier signal and to be displaced in phase from it by only enough to permit the error to be detected. If the carrier signal drifts off of 2.4 kc., by a fraction of a cycle, then the output of the discriminator will reflect this in signal proportional to the error.

It is desirable that this phase locked loop for recovery of the 2.4 kc. carrier frequency have a narrow band width, i.e., a slow period of response. This is because the data bandwidth includes the carrier frequency and thus data frequency components may be surrounding and even over it and a phase locked loop which has a band-pass of more than a few cycles may pick up enough data frequency components so as to cause undesirable variations in the frequency of the output of the voltage controlled oscillator 540. In other words, the data signal frequencies which are close to the carrier signal will cause the phase discriminator 535 output to include signals having a very low frequency. They will be applied to the voltage controlled oscillator 540 to vary the output of the oscillator 540 in a fashion other than that dictated by the changing phase of the carrier frequency itself. The problem is substantially eliminated by using a phase discriminator 535 that includes a very narrow band filter having a bandwidth on the order of 0.1 c.p.s. and with a period of response fast enough to track the slow drift in carrier frequencies but too slow to track the fast changes of the data.

Ideally, this phase lock loop would track the carrier frequency. The oscillator 540 would thus be locked to the phase of the carrier being supplied to the balanced demodulator and would supply a signal to the demodulator 515 for demodulation at that frequency.

Unfortunately, two problems arise with a very narrow band phase locked loop. The first problem is that if the carrier signal has been shifted by the telephone link more than a couple of cycles from the center frequency of the voltage controlled oscillator 540, then the phase locked loop will not latch onto the carrier. It might be pointed out that once the phase locked loop has latched onto the carrier, then it will track with the carrier over a much wider range of frequencies than the normal frequency band of the phase locked loop. But there remains the problem of initially latching onto a carrier frequency that comes through initially displaced more than a couple of cycles from the center frequency of the voltage controlled oscillator.

A second problem arises out of the fact that it has been found that the carrier frequency itself jumps a few cycles at a time at a fast rate. That is, the carrier frequency not only drifts at a relatively slow rate, which slow rate can be tracked by the voltage controlled oscillator 540 once the oscillator 540 has latched onto that frequency, but also jitters. This jitter is presumably due to instabilities in the various oscillators employed in the modulators and demodulators within the telephone link. Since the phase locked loop must have a narrow bandwidth to filter out the data frequency components it will also filter out the jitter frequency components or, in other words, it won't track the jitter. That is, as the 2.4 kc. carrier signal jitters about its desired frequency due to the various instabilities within the oscillators and other elements of the telephone link, a signal is generated by the phase discriminator 535 which has a frequency that corresponds to the jitter rate. This jitter rate frequency is blocked by the very narrow 0.1 c.p.s. band-pass filter that is incorporated in the discriminator 535 and thus will not be applied to the voltage controlled oscillator 540. Accordingly, the output of the oscillator 540 will not track with the jitter signal.

In order to provide the most accurate detection of the pulse data, it is desirable that the control frequency applied to the balanced demodulator 515 track both the slow drift and the fast jitter of the carrier about which it is to demodulate. Otherwise, there will be distortion noise from the output of the demodulator 515 which is too fast to be properly compensated for by the adaptive equalizer which can follow drift in phase distortion, but not jitter, and which may therefore cause intersymbol interference.

In order to have the voltage controlled oscillator 540 provide an output signal for the balanced demodulator 515 which does track the jittering of the carrier frequency, it is necessary to have a much wider band discriminator 535. But, as has been described, this wider band discriminator cannot be used because it will pick up too much of the data signal frequencies and thus apply a control signal to the voltage controlled oscillator 540 that is irrelevant to the carrier signal frequency. Accordingly, the output of the voltage controlled oscillator will not be identical with the output carrier signal frequency and the balanced demodulator will not operate at optimum performance to provide output signals having minimum distortion.

Figure 6A:
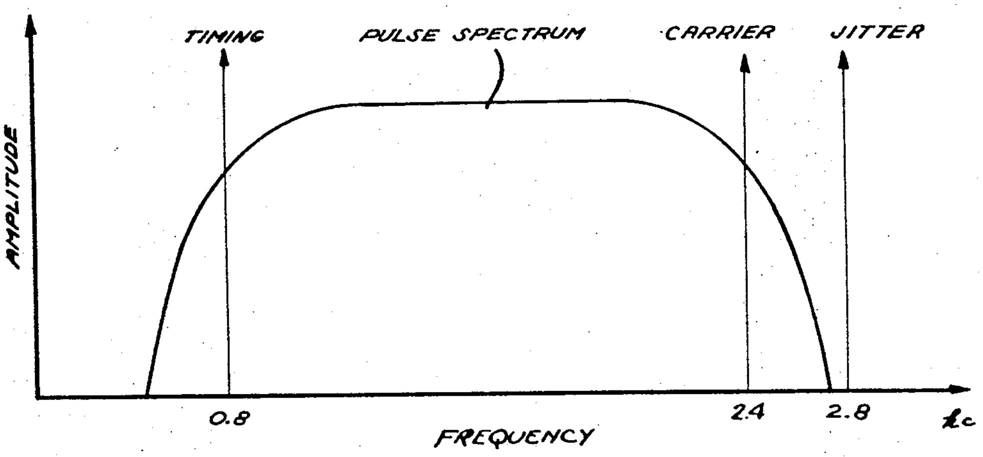
FIG. 6A is a frequency distribution diagram of the signals employed in transmitting over a telephone link.

One solution to the problem is shown in FIG. 6. By this technique, to be described in connection with the system of FIGS. 4 and 5, an additional pilot tone must be transmitted as a second reference carrier. This pilot tone, which we will call herein a jitter pilot tone, is at the upper frequency limit of the telephone system, say, 2.8 kc., and is sufficiently removed from the carrier frequency of 2.4 kc. so as to be outside of the data frequency band as shown below. The relationship between the pulse spectrum carried over the telephone lines, the 1.6 kc. timing pilot tone, 2.4 kc. carrier signal and 2.8 kc. jitter pilot tone is shown in FIG. 6A. Since the jitter pilot tone is outside of the data frequency band, a relatively wider band and fast response phase locked loop can be employed to track the jitter pilot tone. Such a phase lock loop is shown in FIG. 6 as the phase discriminator 605 and voltage controlled oscillator 610. The phase discriminator 605 has a relatively wide bandwidth, such as 20 c.p.s., compared to the 0.1 c.p.s. bandwidth of the narrow band discriminator 535. The oscillator 610 has as its center frequency the jitter pilot tone frequency of 2.8 kc. Since the output of the discriminator 605 represents the effects of jitter, it will provide a voltage controlled oscillator 610 output that tracks with jitter. Thus, this phase locked loop 605, 610 will not only latch onto the jitter control tone when the jitter control tone is displaced by as much as 20 cycles from the 2.8 kc. generated at the transmitter but will also respond to the jitter frequency that is generated in the telephone link. Accordingly, the voltage at the output of the discriminator 605 of this relatively wide band phase locked loop will vary as required to cause the voltage controlled oscillator 610 output to vary with the jitter frequency.

At this point, it must be appreciated that the jitter imposed by the telephone link on the 2.8 kc. jitter control tone is virtually identical with the jitter imposed on the 2.4 kc. carrier signal. Thus, the output voltage from the relatively wide band discriminator 605 can be added with proper gain control by adder 615 to the output voltage from the narrow band phase discriminator 535 to apply a net voltage to the voltage controlled oscillator 540 that has a component which tracks with the jitter as well as the component necessary to track with the drift in the carrier frequency. Thus, the first voltage controlled oscillator 540 will have a center frequency of 2.4 kc. and will vary about that center frequency not only as the carrier frequency slowly varies with time over a number of cycles but will also vary as the carrier frequency jitters rapidly over a few cycles. For this use of the phase locked loops, the gain constant $k_1$ of the voltage controlled oscillator 540 and the gain constant $k_2$ of the voltage controlled oscillator 610 should be such that their product is 1, i.e., $k_1k_2=1$.

A data filter 620 is needed to filter the signal supplied to the demodulator 515 and it is preferably used before the input to the narrow band phase discriminator. A pilot tone filter 625 is used before the phase discriminator 605 primarily to change the phase of this tone by the same amount that the data filter 620 has changed the phase of the carrier.

The output from the balanced demodulator 515 is fed to a sharp cutoff low-pass filter 520 to eliminate double frequency components from the demodulator. This filter 520 would have its sharp cutoff just above the 1.6 kc. primary pilot tone.

It might be noted that these sharp cutoff filters 410, 420, 505 and 520 need not be designed to have linear phase or even near linear phase characteristics. There are modem designs whose convergence is enhanced greatly by the inclusion of linear phase filters at these points. However, one of the practical advantages of the design of this invention is that the expensive and difficult to build linear phase filter is not required. Indeed, the equalizing technique of this invention in no sense requires the good phase characteristics in transmission for convergence. However, it might be noted that if the phase characteristics are bad enough, then a larger number of coefficients $X_i$ might be required in the equalizer. The equalizing technique of this invention provides convergence on all telephone lines no matter how poor their transmission or phase characteristics. The limitation in the transmission of data as a function of how poor is the line is a bandwidth and noise limitation. The faster one tries to transmit data, the greater is the bandwidth required and thus the greater is the noise picked up in transmission. The equalizer of this invention, although it will converge, will also amplify whatever noise is in the system, which noise will increase as the bandwidth of the telephone line or low-pass filter becomes smaller in proportion to the rate at which the data is transmitted.

By contrast, other known modems will not converge on all telephone lines or low-pass filters but will only converge on those lines having relatively favorable transmission and phase characteristics. Thus, such modems must be designed with an eye to the phase characteristics of the filters used in the modulation system as well as with an understanding that the links (telephone lines) employed are limited in terms of the transmission and phase characteristic to those links which may be employed. A modem designed in accordance with the teachings of this invention simply does not have to concern itself with these problems. It will always converge.

Other Desired Equalizer Responses Useful for the Telephone Line

The embodiments described above have assumed that the desired equalizer output samples in response to an isolated test pulse would be all zeros except for one central sample whose value would be one. It will be understood that this is only one of numerous desired responses that may be usefully employed with the iterative techniques described above.

An example of the usefulness of a different desired response will now be described.

Certain telephone lines have serious phase jitter. It will be recalled that when transmission over telephone lines is involved the data signal must be modulated onto a carrier before transmission, and the carrier must be recovered at the receiver for demodulation.

The equalizer, when instrumented for a response having all zeros except for the central sample, requires a data pulse spectrum in the frequency domain as shown in FIG. 6*a*. The presence of the data pulse spectrum around the carrier requires that a very narrow (and therefore slow) phase lock loop be used to recover the carrier. For telephone lines have serious phase jitter, it is not possible for the slow loop to track the fast jitter, which in turn causes inaccurate recovery of the carrier and therefore excessive error rate in the output data.

According to another aspect of the present invention this difficulty can be overcome by instrumenting the equalizer for a desired response which permits a null in the data pulse spectrum. The transmitted data pulse spectrum is shaped to have this null and to be small for a band of frequencies around the null and the carrier frequency is then placed at this null. In this case a much wider bandwidth (hence much faster) phase lock loop can be employed to recover the carrier and reduce the error rate in the output data.

The general rule which will make this possible is that there be at least two nonzero samples in the desired response and that the algebraic sum of the desired samples be zero.

For a specific example, the equalizer may be instrumented for a desired response of all zeros except for a +1 for one sample near the center, followed by a zero, and then a −1 for the next sample. Thus, for an equalizer having 11 taps the response as a single test pulse proceeds through the equalizer would be as follows: 1000010–10000. The pulse spectrum corresponding to this equalizer operation is shown in FIG. 11. In order to alter the embodiment of FIGS. 2, 4 and 5 to take advantage of this desired response the filter 410 of FIG. 4 is changed to a band-pass filter, and the phase lock loop 535 and 540 (FIG. 5) is speeded up by approximately 100 times (i.e. the bandwidth is increased by approximately 100 times). Because of the nulls in the pulse spectrum it is now possible to operate at 4800 pulses per second (versus the 3200 rate) and the carrier pilot is then placed at 2.88 kc.

Further advantage of this desired response is obtained by placing the timing pilot tone in a second null of the pulse spectrum which is at a frequency of 0.48 kc. (see FIG. 11). With this relation it is possible to recover the timing pilot with a much faster phase lock loop and thereby track line instabilities much more accurately. To instrument this the phase lock loop formed by elements 204, 216 and 218 of FIG. 2 are designed to operate with approximately 100 times greater speed than previously mentioned i.e. the bandwidth is 100 times greater.

To instrument the equalizer of FIG. 2 to operate with the desired response just stated, equation (3) of FIG. 2A is changed merely by the addition of the single term $d_{i,2}$, so that the desired response is represented by the two terms $(-d_{i,0} + d_{i,2})$. The $S_i$ recirculating memory 270 is instrumented to operate accordingly.

To instrument the equalizer of FIG. 8 to operate with this response, Equation (8) in the text is specialized to:

$$C_i' = 1/K \sum_k [Z_k' - (D_k - D_{k-2})] Y_{k-i}$$

where for this special case: $D_k$ is the data output of the decision device at the $k$ th time instant.

Another desired response which is useful for combatting phase jitter comprises an output of all zeros except for a plus one for one sample near the center followed by three zeros and then a minus one for the next sample, thus: 0001000–1000. The advantage of this desired response is that the corresponding pulse spectrum has a null in the middle of the spectrum in which a pilot tone can be placed to more accurately measure the phase jitter. This pulse spectrum is shown in FIG. 12. To instrument the equalizer of FIG. 8 to operate with this response, it is readily seen that Equation (8) in the text is changed simply by replacing the term $D_{k12}$ by $D_{k14}$. To utilize this response in combatting phase jitter the circuit of FIG. 5 may be modified as indicated in FIG. 13.

In this circuit a phase lock loop 521, 522, 523, 524 and 526 is used to track the midband pilot tone at 1.68 kc. and to produce at the output of filter 322 a signal related to the sensed phase jitter. This signal is then introduced into the carrier recovery phase lock loop 531, 532, 533, 534 and 536 in order to cause the carrier signal fed to the demodulator to contain the same jitter as sensed in the midband pilot tone. In this manner the jitter in the demodulating carrier more accurately represents the jitter that has affected the data signal.

Still another aspect of the invention is the discovery of a class of desired responses for the equalizer of the form $d_o=1$, $d_k=-1/N$ for $N$ values of $K$ where $K$ is positive and $N$ is greater than 1. In general these responses offer improved performance, and may lead to favorable solutions to problems such as timing recovery, simplification of digital multiplexing operations and the phase jitter problem mentioned above.

A specific example for the phase jitter problem would be a desired response of approximately one half zeros, a sample equal to one near the center, followed alternately by zeros and values of $-1/N$, thus: 00000010–1/4 0–1/4 0–1/4 0–1/4 This pulse spectrum is shown in FIG. 14, and appropriate changes in the equation will be understood from the discussion above. To provide a null within the spectrum spaced from the edges with this class of response, more zeros may be added between nonzero outputs.

FIG. 15 is a general diagram of an equalizer for this class of desired responses and adapted for use upon telephone lines.

According to another aspect of the invention a desired response is selected which yields one or more nulls within the data pulse spectrum and pilot tones which are placed at these nulls (e.g. FIG. 12) are employed in the timing recovery circuits to obtain groupings of the output data bits. Using the example of FIG. 12 the receiver timing recovery circuits (204, 208, 216, 218 of FIG. 2) would be implemented to lock to a frequency equal to the difference of the two pilot tone frequencies (i.e. 1.2 kc.) In this way a 1.2 kc. signal is obtained which can be used to provide eight bit groupings of received 9600 b.p.s. data signal and thus can be used for multiplexing and demultiplexing of up to eight individual slower data streams.

It will be understood from this discussion that the employment of desired responses that have at least two nonzero samples spaced from each other by at least two zero samples lead to pulse spectra with midband zeros which thus can be employed to simplify multiplexing operations or other operations involved in data recovery.

FIG. 16 is a block diagram of a multiplexer employing this concept.

In General

The invention has been described above primarily as respects the transmission of amplitude pulses that have been modulated to discreet amplitude levels, each level being susceptible of translation to a digital value. There are other applications in which it is desirable to transmit a pulse whose amplitude is continuously variable as, for example, in television or other facsimile reproduction techniques, and this system may be used in connection with such transmissions to ensure that the pulse amplitudes, whatever they are, are received without distortions and the use of this system for such transmissions makes it possible to use connecting links of poorer characteristics than could be used without this compensation for pulse distortion. This present system is valuable for television and facsimile applications because of the fact that the equalizer is an inverse filter in the sense that it makes each output sample $Z_k$ correspond to a single input or transmitted pulse. If the signal to be transmitted has a generally known wave form, as, for example, that from a television camera, this signal can be sampled, and the sample signal transmitted as a pulse of particular modulation, received and the distortion compensated for, and then the original signal reconstituted in accordance with the known wave form.

The invention has been described above in preferred embodiments; other applications of the invention will be apparent to those skilled in the art in view of the discussion above.

It should be understood that the data pulse rate is chosen for the preferred embodiment at 3200 pulses per second because this is the fastest pulse rate that can be used with a wide variety of ordinary telephone lines. The system itself can be used on some lines, selected for their favorable lack of phase and other pulse distortion, to transmit pulse rates up to about 4800 pulses per second which is approximately the limitation imposed by the bandwidth of the telephone system.

Accordingly, it shall be understood that the following claims are directed to the inventive techniques described herein and are not limited to application to the systems described.

For example, the link may be a telephone line, the atmosphere in radio transmission or any other means for coupling a receiver to a transmitter. The basic equalizing method to which the invention applies may be either a tapped delay line equalizer or a digital filter. As long as the basic equalizer has variable coefficients whose value affects equalization, this invention may be applied. Furthermore, this invention applies to a modem incorporating any means for estimating or measuring the equalizer output errors. The use of pseudo-noise and the use of widely spaced reference pulses are two such estimation techniques. But this invention of weighting the estimates obtained is not limited to either one or both of these estimation techniques.

What is claimed is:

1. In an adaptive equalizer wherein a digital filter having N variable coefficients $X_i$ is employed to provide equalization and wherein said filter is adapted to receive information pulses which are the sum of a sequence of data pulses and a sequence of pseudo-noise pulses, said filter including means to cross-correlate the received pseudo-noise pulse sequence after digital filtering with a locally generated pseudo-noise pulse sequence to provide a sequence of estimated error $S_j$ values, the improvement comprising:

A. storage means for storing a set of predetermined weight $H_i$ values,

B. error weighting means including a multiplier to multiply each estimated error $S_j$ value by a separate weight value to provide a set of N weighted error values.

C. and correction means connected to correct each coefficient $X_i$ by addition of a correction $C_i$, D. said error weighting means and said correction means constructed to cooperate to apply said corrections in accordance with the equations $$C_i = -\sum_{j=-N}^{N} S_j H_{i-j},\ |i-j| \leqq N$$

where $S_j$ are the estimates of the errors formed from equalizer output samples by cross-correlation with pseudo-noise;

$H_{i,j}$ are the predetermined weights;

$|i-j| \leqq N$ means that the difference between i and j, ignoring the sign (+or–) of the difference, cannot exceed N.

2. The adaptive equalizer improvement of claim 1 further characterized by:

cross-correlation means to cross-correlate the unequalized received pseudo-noise pulse sequence with a locally generated pseudo-noise pulse sequence to provide a set of at least N of said weight $H_i$ values.